United States Patent
Novotny et al.

(10) Patent No.: US 7,190,854 B1
(45) Date of Patent: Mar. 13, 2007

(54) METHODS FOR FORMING AN ARRAY OF MEMS OPTICAL ELEMENTS

(75) Inventors: Vlad J. Novotny, Los Gatos, CA (US); Parvinder Dhillon, Fremont, CA (US)

(73) Assignee: Active Optical Networks, Inc., Fremont, CA (US)

( * ) Notice: Subject to any disclaimer, the term of this patent is extended or adjusted under 35 U.S.C. 154(b) by 0 days.

(21) Appl. No.: 11/176,711

(22) Filed: Jul. 6, 2005

Related U.S. Application Data

(63) Continuation of application No. 10/035,829, filed on Oct. 18, 2001, now Pat. No. 6,963,679, which is a continuation of application No. 09/981,628, filed on Oct. 15, 2001, now abandoned, and a continuation-in-part of application No. 09/880,465, filed on Jun. 12, 2001, now Pat. No. 6,625,341, and a continuation-in-part of application No. 09/865,981, filed on May 24, 2001, now Pat. No. 6,483,962.

(60) Provisional application No. 60/241,269, filed on Oct. 17, 2000, provisional application No. 60/211,239, filed on Jun. 12, 2000, provisional application No. 60/206,744, filed on May 24, 2000.

(51) Int. Cl.
*G02B 6/35* (2006.01)
(52) U.S. Cl. ........................................................ 385/18
(58) Field of Classification Search .................... None
See application file for complete search history.

(56) References Cited

U.S. PATENT DOCUMENTS

| | | | |
|---|---|---|---|
| 4,662,746 A * | 5/1987 | Hornbeck | .................... 359/223 |
| 5,506,394 A | 4/1996 | Plesko | |
| 5,724,015 A | 3/1998 | Tai et al. | |
| 5,724,123 A | 3/1998 | Tanaka | |
| 5,841,917 A | 11/1998 | Jungerman et al. | |
| 5,872,880 A | 2/1999 | Maynard | |
| 6,028,689 A | 2/2000 | Michalicek et al. | |

(Continued)

FOREIGN PATENT DOCUMENTS

WO    WO 01/96924 A1    12/2001

OTHER PUBLICATIONS

U.S. Appl. No. 60/206,744, filed May 24, 2000, Novotny.

(Continued)

*Primary Examiner*—Rodney Bovernick
*Assistant Examiner*—M. J. Stahl
(74) *Attorney, Agent, or Firm*—Silicon Edge Law Group, LLP; Arthur J. Behiel

(57) ABSTRACT

An embodiment of the invention comprises an optical element capable of motion in at least one degree of freedom wherein the motion in at least one degree of freedom is enabled by serpentine hinges configured to enable the optical element to move in at least one degree of freedom. The embodiment further includes driving elements configured to deflect the optical element in said at least one degree of freedom to controllably induce deflection in the optical element and a damping element to reduce magnitude of resonances. Another embodiment includes a MEMS optical apparatus comprising an optical element capable of motion in two degrees of freedom. The two degrees of freedom are enabled by two pairs of serpentine hinges. A first pair of serpentine hinges is configured to enable the optical element to move in one degree of freedom and a second pair of serpentine hinges is configured to enable the optical element to move in a second degree of freedom. The apparatus further includes driving elements configured to deflect the optical element in said two degrees of freedom and a damping element to reduce magnitude of resonances. The invention includes method embodiments for forming arrays of MEMS optical elements including reflector arrays.

13 Claims, 22 Drawing Sheets

U.S. PATENT DOCUMENTS

| | | | |
|---|---|---|---|
| 6,097,859 | A | 8/2000 | Solgaard et al. |
| 6,172,817 | B1 | 1/2001 | Senapati et al. |
| 6,201,629 | B1 | 3/2001 | McClelland et al. |
| 6,252,466 | B1 | 6/2001 | Kawamura |
| 6,253,001 | B1 | 6/2001 | Hoen |
| 6,283,601 | B1 | 9/2001 | Hagelin et al. |
| 6,301,403 | B1 | 10/2001 | Heanue et al. |
| 6,320,993 | B1 | 11/2001 | Laor |
| 6,337,760 | B1 | 1/2002 | Huibers et al. |
| 6,360,035 | B1 | 3/2002 | Hurst et al. |
| 6,430,331 | B1 | 8/2002 | Hagelin et al. |
| 6,445,844 | B1 | 9/2002 | Neukermans et al. |
| 6,483,962 | B1 | 11/2002 | Novotny |
| 6,542,665 | B2 | 4/2003 | Reed et al. |
| 6,549,691 | B1 | 4/2003 | Street et al. |
| 6,556,739 | B1 | 4/2003 | Kruglick |
| 6,563,106 | B1 * | 5/2003 | Bowers et al. ............... 250/216 |
| 6,577,793 | B2 | 6/2003 | Vaganov |
| 6,580,846 | B1 | 6/2003 | Burroughs et al. |
| 6,625,341 | B1 | 9/2003 | Novotny |
| 6,697,547 | B2 | 2/2004 | Walter et al. |
| 6,822,776 | B2 * | 11/2004 | Hah et al. .................... 359/224 |
| 6,914,871 | B2 * | 7/2005 | Hara et al. ............. 369/112.29 |
| 2002/0005976 | A1 | 1/2002 | Behin et al. |
| 2002/0063339 | A1 * | 5/2002 | Sun et al. ................... 257/773 |
| 2002/0130561 | A1 | 9/2002 | Temesvary et al. |
| 2002/0171327 | A1 | 11/2002 | Miller et al. |
| 2002/0186918 | A1 | 12/2002 | Burroughs |

OTHER PUBLICATIONS

U.S. Appl. No. 60/241,269, filed Oct. 17, 2000, Novotny.
U.S. Appl. No. 60/211,239, filed Jun. 12, 2000, Novonty.
U.S. Appl. No. 09/981,628, filed Oct. 15, 2001, AO-555.
U.S. Appl. No. 10/035,829, filed Oct. 18, 2991, Novotny et al.
Walker, James A., "The Future of MEMS in Telecommunications Netowrks." pp. R1-R7. Bell Laboratories, Lucent Technologies. Feb. 2, 2000.
Elwenspoek, et al., "Silcion Micromachining." 1998. Cambridge Univeristy Press. Cover page, pp. 102-111, pp. 160-161, and p. 282.
Maluf, Nadim, "An Introduction to Microelectromechanical Systems Engineering." 2000. Cover page, pp. 64-73 and 186-189.
Rai-Choudhury, "Handbook of Microlithography, Micromachining, and Microfabrication." 1997. SPIE Optical Engineering Press. pp. 110-116 and 120-122.
Conant, Robert. et al., "A Flat High-Frequency Scanning Micromirror." Solid State Sensor & Actuator Workshop, Hilton Head, SC. 2000.
Bishop, D.J., "Silicon Micromachines for Lightwave Networks: Can Little Machines Make it Big?" 83 pages. Feb. 1999.
Bishop, D.J., "Silicon Micromachines for Lightwave Networks: The Little Machines that will Make it Big." SPIE vol. 11, No. 2, 12 pages. Dec. 2000.
Bishop, David J., et al., "The Rise of Optical Switching." Scientifice American, pp. 88-94. Jan. 2001.
Blumenthal, Daniel J., "Routing Packets with Light." Scientifice American, pp. 96-99. Jan. 2001.
Ehrfeld, Wolfgang, et al., "Application of Micro- and Nanotechnologies for the Fabrication of Optical Devices." SPIE, vol. 3276, pp. 2-14. 1998.
Grade, John D., et al., "A Large-Defelction Electrostatic Actuator for Optical Switching Applications." pp. 1-4. Presented at Hilton Head 2000.
Laor, Herzel, "Construction and Performance of a 576×576 Single-Stage OXC," LEOS. 3 pages. Nov. 8, 1999.
Laor, Herzel, "Performance of a 576×576 Optical Cross Connect." NFOEC, pp. 1-5. Sep. 26, 1999.
Lee, Sangwoo, et al., "The Surface/Bulk Micromachining (SBM) Process: A New Method for Fabricating Released MEMS in Signle Crystal Silicon." Journal of Mocroelectromechanical Systems, Dec. 1999.
Milanovic, Veljko, "Optical MEMS for Optical Communications—Trends and Developments." Adriatic Research Institute. pp. 2-6. Dec. 2001.
Nee, Jocelyn T., et al., "Lightwave, Optically Flat Micromirrors for Fast Beam Steering.". Presented at IEEE/LEOS Optical MEMS Conference in Kauai, Hawaii. 2 pages. Aug. 2000.
Tien, Norman C. et al., "MEMS Actuators for Silicon Micro-Optical Elements." Proceedings of SPIE vol. 4178. pp. 256-267. 2000.
Bezuk, Steve, PH.D., "Flip Chip Challenges." HD Magazine. 6 pages. Feb. 2000.
Chen, YiJian, "Control and Shape DEsign of an Electrically-Damped Comb Drive for Digital Switches." MOEMS and Miniaturized Systems. Proceedings of SPIE, vol. 4178. pp. 387.
Dawson, J.M. et al., "MEMS Feedbach Control Using Through-Wafer Optical Device Monitoring." Proc. of SPIE vol. 4178, MOEMS and Miniaturized Systems. Sep. 2000.

* cited by examiner

200

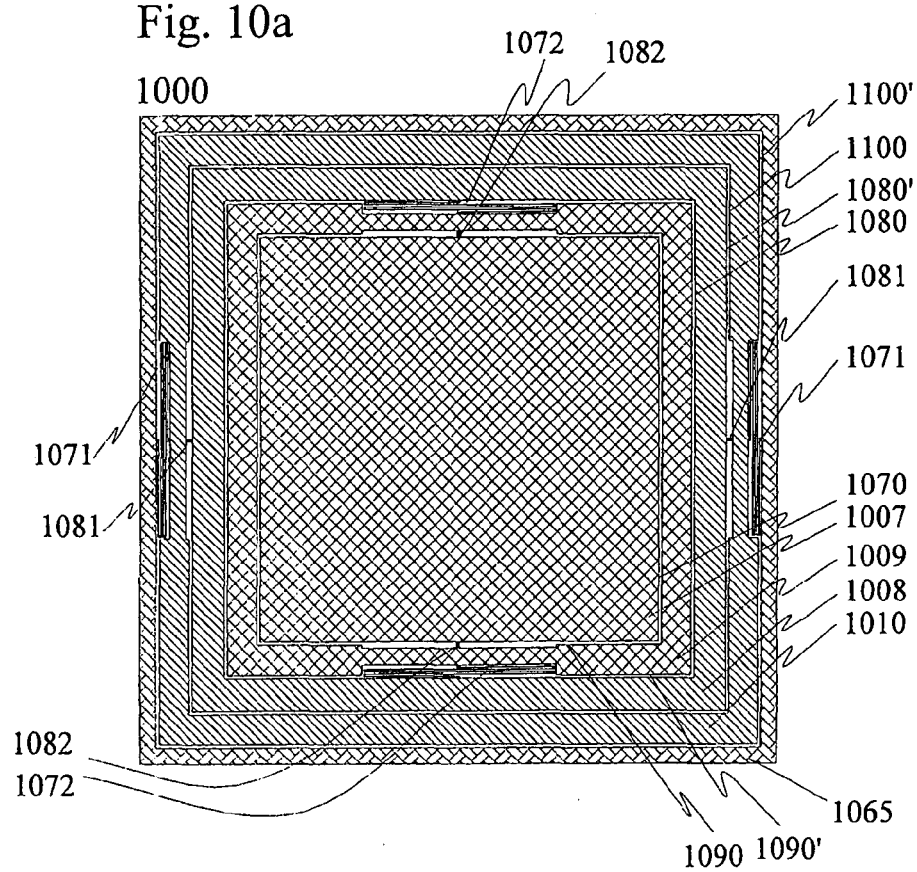

METHODS FOR FORMING AN ARRAY OF MEMS OPTICAL ELEMENTS

CROSS-REFERENCE TO RELATED APPLICATIONS

This U.S. patent is a continuation of application Ser. No. 10/035,829 entitled "Micro-Opto-Electro-Mechanical Switching System," by Vlad Novotny and Parvinder Dhillon, filed Oct. 18, 2001 now U.S. Pat. No. 6,963,679, application Ser. No. 10/035,829 is:
1. a continuation of application Ser. No. 09/981,628, filed Oct. 15, 2001 now abandoned, also by Vlad Novotny and Parvinder Dhillon;
2. a continuation-in-part of application Ser. No. 09/865,981, now U.S. Pat. No. 6,483,962 B2, i ssued on Nov. 19,2002, entitled "Optical Cross Connect Switching Array System with Optical Feedback" filed on May 24, 2001 and invented by Vlad J. Novotny, which claims priority under 35 U.S.C. §119(e) from U.S. patent application Ser. No. 60/206,744, entitled, "Optical Cross Connect Switching Array Systems With Optical Feedback Control" filed May 24, 2000; and from U.S. patent application Ser. No. 60/241,269, entitled, "Micro-Electro-Mechanical Systems for Optical Switches and Wavelength Routers," by Vlad J. Novotny and Parvinder Dhillon, filed Oct. 17, 2000.
3. a continuation-in-part of application Ser. No. 09/880,456, now U.S. Pat. No. 6,625,341 B1, issued Sep. 23, 2003, entitled: "Optical Cross Connect Switching Array System with Electrical and Optical Position Sensitive Detection", invented by Vlad J. Novotny, filed Jun. 12, 2001. U.S. Pat. No. 6,625,341 B1 is a continuation-in-part of aforementioned application Ser. No. 09/865,981, filed May 24, 2001, U.S. Pat. No. 6,483,962 B2; and claims priority under 35 U.S.C. §119(e) from U.S. patent application Ser. No. 60/211,239, entitled "Optical Cross Connect Switching Array Systems With Multiple Optical And Electrical Position Signal Detectors," by Vlad J. Novotny, filed Jun. 12, 2000.

Each of the above-referenced patents and applications is hereby incorporated by reference.

FIELD OF THE INVENTION

The invention generally described herein relates to the design and fabrication of micro-optic devices. In particular, the present invention pertains to micro-electro-mechanical systems (MEMS) optical assemblies used in fiber optic switching arrays, wavelength routers, laser scanners, bar code scanners, variable optical attenuators (VOA), wavelength tunable lasers, and other related devices. More particularly, the present invention pertains to the design, structure and fabrication of MEMS reflectors and hinges used in fiber optic switching devices.

BACKGROUND

As is well known, fiber optic technology is a rapidly growing field with vastly expanding commercial applicability. As with all technologies, fiber optic technology is faced with certain practical difficulties. In particular, the design and fabrication of arrays of optical elements that enable the efficient switching and coupling between input optical elements and output optical elements in an optical network is a significant consideration of designers, manufacturers, and users of optical systems. Optical systems commonly use laser generated light beams, to carry information through optical fibers and are directed through complex optical paths with the assistance of optical switching elements, routers and other like components. Other applications include wavelength routers that demultiplex incoming signals into individual wavelength and then switch in the nonblocking fashion single wavelengths between outputs, laser beam deflectors in laser printers, bar code reading devices and others.

FIG. 1 schematically illustrates a portion of a fiber optic network 100. In the depicted embodiment, network 100 routes optical signals through fiber optic lines L from node to node to form an interlaced ring-mesh network structure. Many other configurations of network structures are possible. In the depicted embodiment, the fiber optic lines L are interconnected at optical nodes 101, 102, 103, 104, 105, and 106. The optical signals are directed to their desired destination by optical switching. Typically, this switching is accomplished at the optical nodes 101, 102, 103, 104, 105, and 106 (also referred to herein as switching nodes). Each switching node 101, 102, 103, 104, 105, and 106 accommodates a plurality of fiber optic lines L which comprise input fibers and output fibers. It is the selecting of and switching between these input fibers and output fibers that define the optical paths which route optical signals to their desired target destinations.

FIG. 2(a) is a simplified schematic illustration showing an overview of bi directional optical cross-connect switching array system 200. The system 200 includes fiber arrays 202 and 204 for passing light beams into and out of the switching array system 200. Each fiber array 202, 204 comprises a plurality of fiber optic transmission lines (a portion of which are shown here by fibers 210, 211, 220, and 221). For convenience, fiber array 202 shall be referred to as an incoming fiber array 202 and the fiber array 204 shall be referred to as an outgoing fiber array 204. However, it should be remembered that due to the bi directional nature of the switching array system 200, the terms incoming and outgoing are relative.

Light beams carry information throughout the optical network. The light beams are directed to their final destination by passing through switching array systems 200 which direct the light beams to the desired destination. Electronic control circuitry 230 is used to dynamically control the switch 200 configuration. The control circuitry 230 can include, among other elements, position sensitive detectors, demultiplexing circuitry, photodetectors, position sensing detectors, amplifiers, decoding circuitry, servo electronics, digital signal processors, communication hardware, and an application programming interface. The control circuitry directs entering light beams to the desired exit fibers.

The following simplified illustration describes how a light beam can be switched from one of the incoming fibers in array 202 to a selected one of the fibers in array 204. Such description is also applicable to switching a light beam between any selected fiber in array 204 to a selected fiber in array 202.

In the depicted illustration, the light beam 231 exits the fiber 210 (and in preferred embodiments, passes through a lens array (not shown) so that the beam propagates without significant divergence) onto the reflector array 218. Servo electronics of the control circuitry 230 initiate deflection in a reflector 218' of the reflector array 218 to direct the light beam 231 along an optical path 232 to a desired fiber 220 (in fiber array 204) using a signal from position detection array

234. By changing the deflection of the reflectors (e.g., 218') of the reflector array the light beams can be switched to enter any selected outgoing fiber 204. Also, the deflection of each of the reflectors 218' can be altered in very small ways to fine tune light beam optical characteristics. The reflector 218' deflection can be adjusted in response to instructions contained within the data streams of the light beam 231. Alternatively, reflector 218' deflection can be adjusted in response to instructions provided externally via an application programming interface of, for example, the control circuitry. Other methods of adjusting reflector 218' deflection known to those having ordinary skill in the art can also be used.

A light beam can be switched from one outgoing fiber to another outgoing fiber, by changing reflector deflection angle. For example, if light beam 231, 232 is to be switched from fiber 220 into another outgoing fiber 221, the controller circuitry 230 sends appropriate instructions to the servo electronics which reposition the reflector 218' so that beam 231 is redirected along optical path 233 to fiber 221. Typically, the beams (e.g., 232, 233) pass through a lens array (not shown) which focuses and couples the light beam (here 233) into the outgoing fiber (here 221). It should be noted that although fibers have heretofore been referred to as belonging to the incoming fiber arrays 202 or the outgoing fiber arrays 204, such fiber arrays are bi-directional. In such bi-directional embodiments, light beams also travel from the outgoing fibers in the outgoing fiber array 204 to incoming fibers in the incoming fiber array 202. This is done in the same way as light beams traveling from incoming fibers in the incoming fiber array 202 to outgoing fibers in the outgoing fiber array 204. Also shown in FIG. 2(*a*) are the position-sensitive-detectors 234, which feed the position-error-signals to the controller circuitry 230.

The switching array system 200 is shown as one-dimensional in the embodiment of FIG. 2(*a*) for clarity. In preferred embodiments the aforementioned arrays are two dimensional. For example, in an embodiment with a two-dimensional reflector array 218, there are rows and columns, or some other two-dimensional arrangement of reflectors. The other arrays and alignment structures are similarly two-dimensional in some embodiments. In addition, the overall system is shown as two-dimensional in FIG. 2(*a*). In preferred embodiments, the system is three-dimensional, as the additional dimension in and out of the plane of the paper can be advantageously used to position the various components and minimize the dimensions of the hardware.

It should be noted that although FIG. 2(*a*) depicts the switching device 200 as having a single reflector array 218, many embodiments include two or more reflector arrays instead of just one with or without additional plane reflectors. One such embodiment is schematically illustrated in FIG. 2(*b*). FIG. 2(*b*) is a simplified schematic illustration showing an overview of two-reflector array bi-directional optical cross-connect switching array system 201. The system 201 includes fiber arrays 202 and 204 for passing light beams into and out of the switching array system 201. The fiber arrays 202, 204 include a plurality of fiber optic transmission lines (a portion of which are shown here by fibers 210, 211, 220, and 221). Here, the incoming light beam 234 is directed toward a first reflector array 217 which reflects the beam 234, 235 onto a second reflector array 219 and then into the desired outgoing fiber (here, 221). Switching may be accomplished by altering the deflection of the reflectors of the first reflector array 217 or by altering the deflection of the reflectors of the second reflector array 219 or by altering the deflection of the reflectors of the first reflector array 217 and the reflectors of the second reflector array 219 at the same time. In this example, the path of light beam 234 is altered by the deflection of first reflector 217' which directs the light beam 234 onto the altered beam path 236 onto second reflector 219' and into outgoing fiber 220. Additionally the control circuitry (not shown) controls the reflectors of both the first reflector array 217 and the second reflector array 219. Although structurally somewhat different from the previously discussed embodiment 200, the principles of operation of such multiple reflector array switches 201 are similar. Similar switching functions can be performed using alternative switching configurations. For example, one embodiment can use combined first and second sets of movable reflectors and one fixed reflector. An optical beam can be switched by reflection of an input beam from a movable reflector onto a fixed reflector and from this reflector back onto a movable reflector and into output fiber. Number of reflectors in the combined array is the same as total number of reflectors in two physically separate arrays. Many other configurations are used and known by those having ordinary skill in the art.

MEMS switching arrays can also be used in wavelength routers. One embodiment of such a wavelength router is depicted in FIG. 3. Using wavelength division multiplexing light beams of several wavelengths can be optically transmitted using the same fiber. For example, a single fiber can carry light beams comprising k signals at k wavelengths. These light beams of many wavelengths are coupled from a fiber 331 into a wavelength division demultiplexer 334. The demultiplexer 334 can be based on arrayed waveguide gratings, interference filters, or fiber Bragg gratings. The illustration of FIG. 3 uses an arrayed waveguide grating 334 as a wavelength division demultiplexer. Multi wavelength light beam 345 enters into the first free space region 335, is separated into individual wavelengths in grating 333 and exits through the second free space region 336 where light beams at k wavelengths are spatially separated. Light at each specific wavelength is coupled into linear fiber array that directs light beams onto a lens array 342. Relatively collimated light beams such as 343 and 344 propagate toward mirrors of the first array 337. The light at each specific wavelength is reflected from one mirror in the first array 337 onto a specific mirror of the second mirror array 338 from which the light is directed onto focusing lenses 339 and into a selected output fiber 351. The mirror arrays 337 and 338 can be one-dimensional arrays in order to match the spatial distribution of the light beams or two-dimensional arrays. Mirror arrays 337 and 338 are formed by bi-axial (bi-axially actuated) mirrors.

SUMMARY

In accordance with the principles of the present invention, one embodiment of the invention comprises an optical element capable of motion in at least one degree of freedom wherein the motion in at least one degree of freedom is enabled by serpentine hinges configured to enable the optical element to move in the at least one degree of freedom. The embodiment further includes driving elements configured to deflect the optical element in said at least one degree of freedom to controllably induce deflection in the optical element and a damping element to reduce magnitude of resonances Another embodiment includes a MEMS optical apparatus comprising an optical element capable of motion in two degrees of freedom. These degrees of freedom are enabled by a first pair of serpentine hinges that is configured to enable the optical element to move in one degree of freedom and a second pair of serpentine hinges that is configured to enable the optical element to move in a second degree of freedom. The apparatus further includes driving elements configured to deflect the optical element in said two degrees of freedom and a damping element to reduce magnitude of resonances.

Another embodiment includes a MEMS optical apparatus comprising in combination a support structure, a movable optical element, at least one pair of serpentine hinges, driving elements positioned such that activation of the driving elements can controllably induce deflection in the movable optical element and a damping element. The combination comprising means for inducing a damped rotation of the movable optical element about an axis of rotation defined by each of the at least one pair of serpentine hinges.

A method embodiment for forming an array of MEMS optical elements comprises: providing a silicon-on-insulator (SOI) wafer. Photoresist masking the top and bottom surfaces with appropriate patterning. First etching to remove the top oxide layer in hinge regions defined by the openings in the top photoresist layer exposing a hinge region of the device silicon layer. Forming a second photoresist layer patterning the hinge region of the device silicon layer so that a hinge can be formed. Second etching the patterned hinge region to remove portions of the device silicon layer forming recessed portions and such that unetched surfaces correspond to a hinge. Removing the second photoresist layer, thereby exposing the underlying top oxide layer as a hard mask layer having openings in the hinge region. Third etching the device silicon layer through the openings in the hard mask wherein the recessed portions are etched until the internal oxide layer is reached wherein the previously unetched surfaces are partially etched leaving a portion of the unetched surfaces in place as hinges. Fourth etching the bottom surface of the SOT wafer to form a pocket region and a separation line region. Fifth etching the SOT wafer to remove the internal oxide layer in the pocket region. Forming a reflective layer on at least one surface of the movable optical element, and a sixth etching to remove material from the separation line region to complete the separation line thereby enabling the substrate to be separated into arrays of a desired size.

These and other aspects and advantages of the invention will become apparent from the following detailed description and accompanying drawings which illustrate, by way of example, the principles of the invention.

BRIEF DESCRIPTION OF THE DRAWINGS

For a fuller understanding of the invention, reference is made to the accompanying drawings in the following Detailed Description. In the drawings:

FIGS. 10(a) and 10(b) are plan views of another reflector assembly embodiment in accordance with the principles of the present invention particularly depicting multiple frames, mirror, straight hinge elements, serpentine hinge elements, and the associated underlying driving elements.

Figure 1:
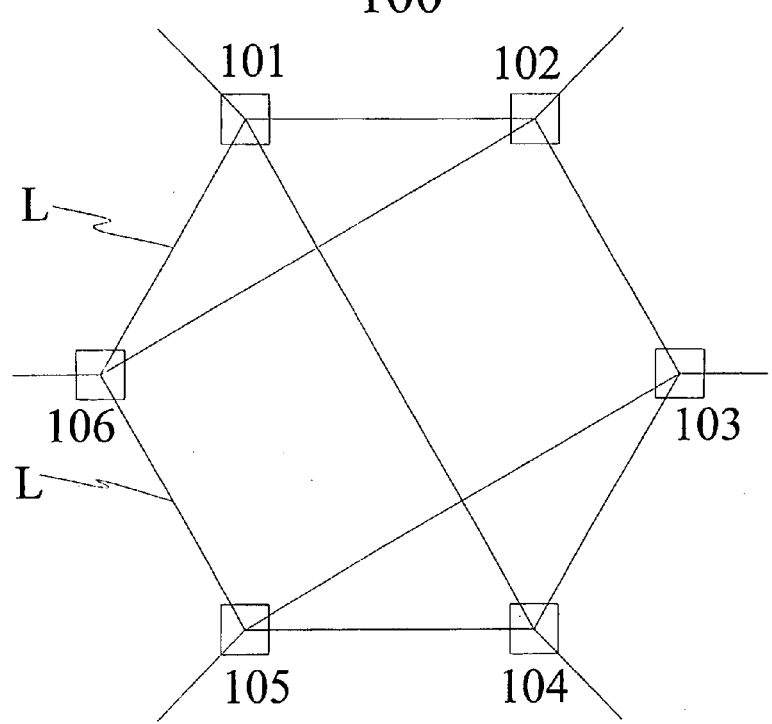
FIG. 1 is a figurative illustration of an optical network.
Figure 2A:
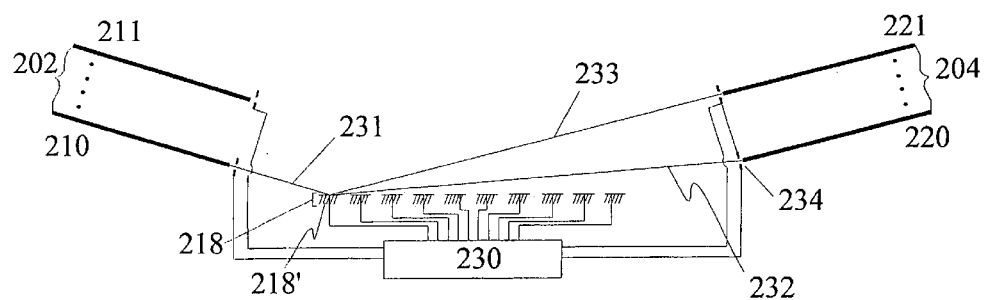
FIGS. 2(a) and 2(b) are simplified schematic illustrations of a single reflector array and two reflector array optical switch embodiments.
Figure 2B:
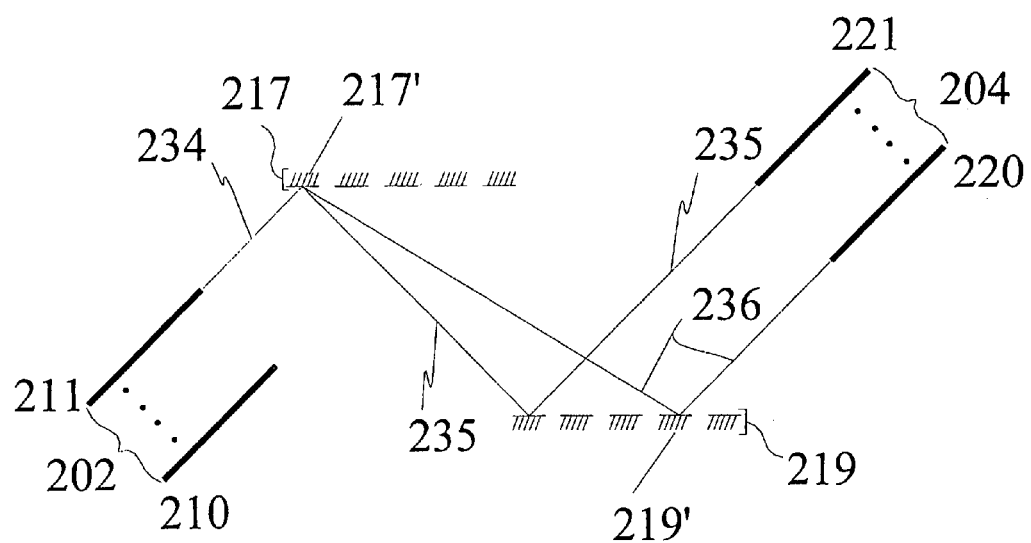
Figure 3:
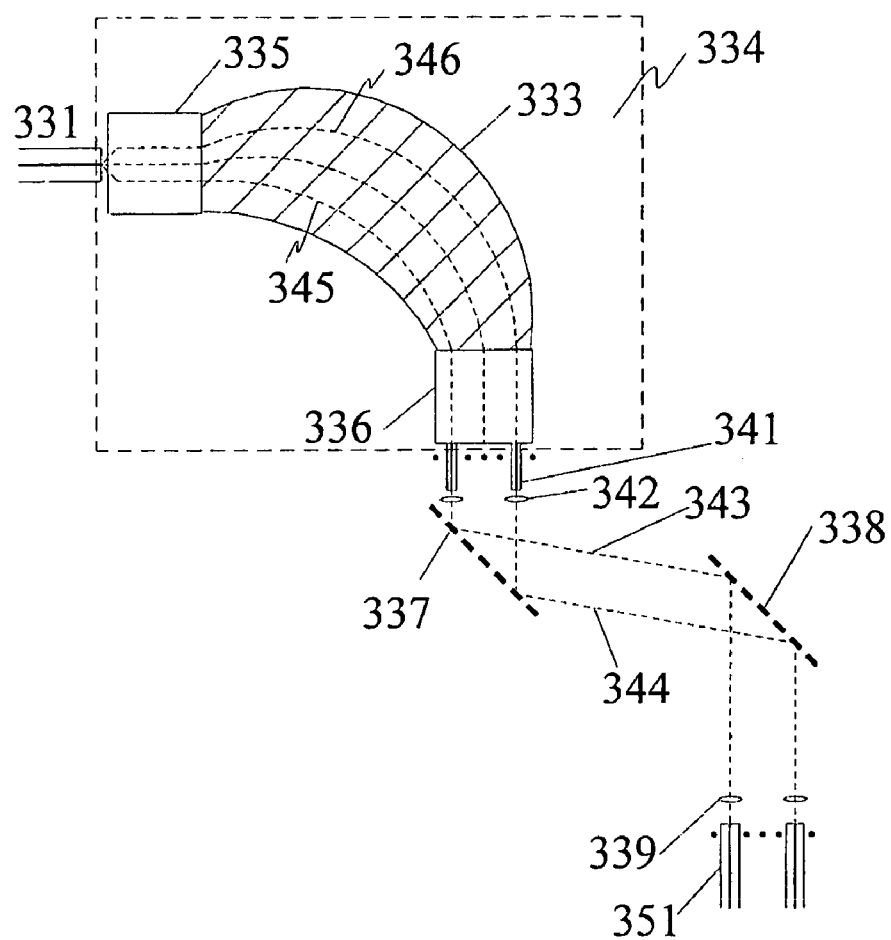
FIG. 3 is a simplified schematic illustration of an embodiment of a wavelength router.

Reference numerals refer to the same or equivalent parts of the present invention throughout the several figures of the drawings.

DETAILED DESCRIPTION

The present invention has been particularly shown and described with respect to certain preferred embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

Figure 4A:
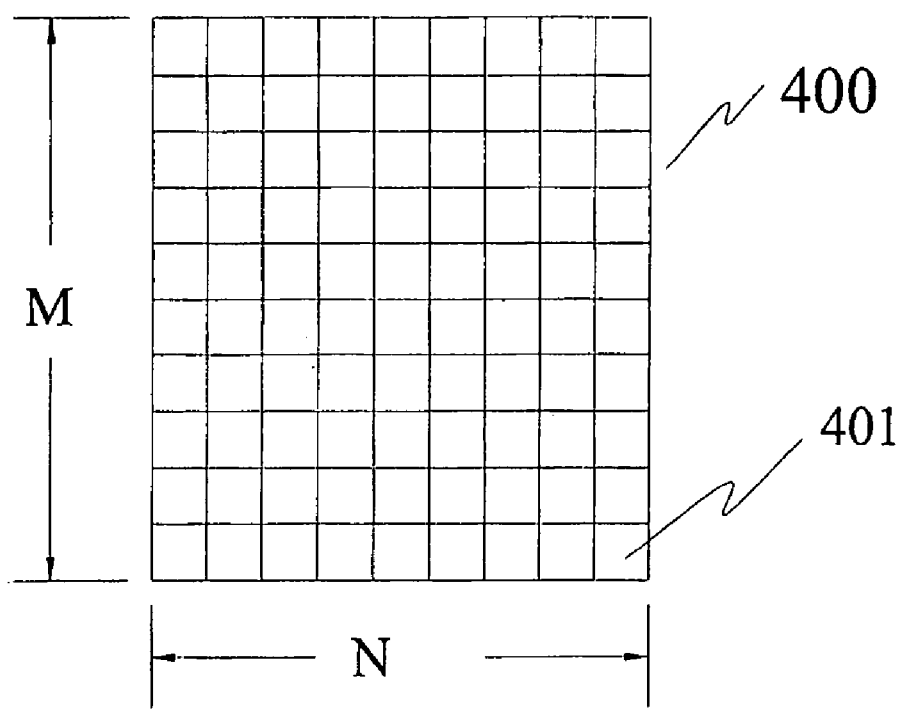
FIG. 4(a) is a top down view of an embodiment of a reflector array.
Figure 4B:
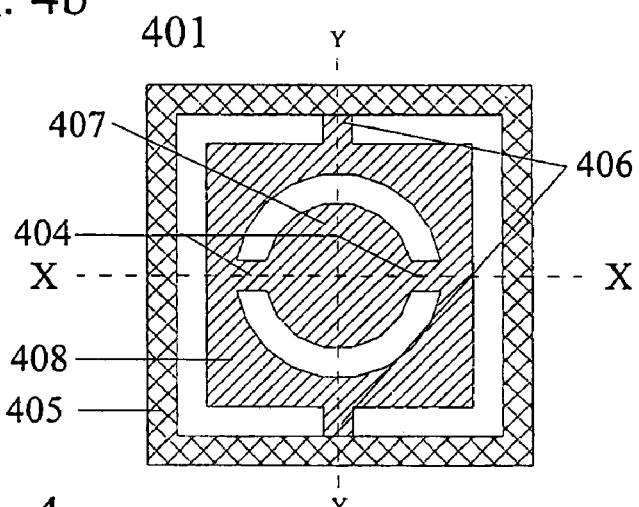
FIGS. 4(b) and 4(c) are top down views of an embodiment of a reflector assembly.
Figure 4C:
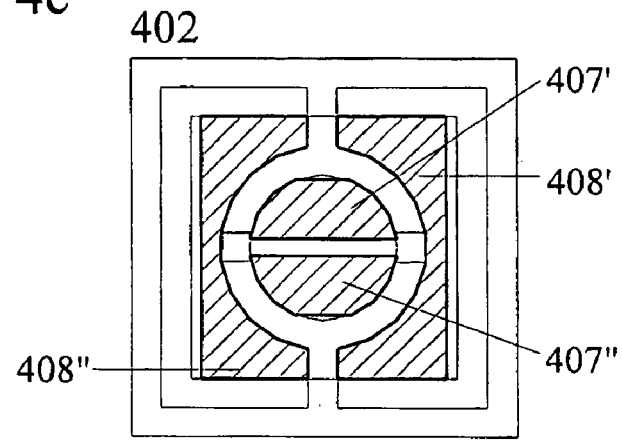
Figure 4D:
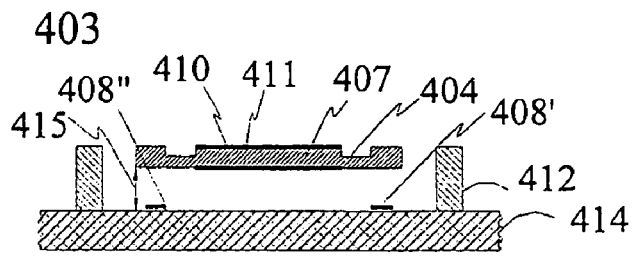
FIGS. 4(d) and 4(e) are cross section views of a portion of the embodiment shown in FIGS. 4(b) and 4(c).
Figure 4E:
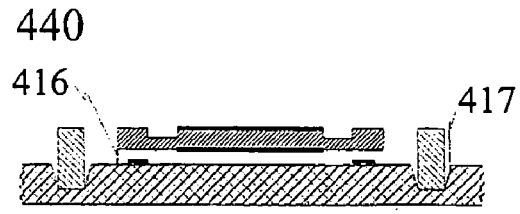

FIG. 4(a) figuratively depicts a plan view of an embodiment of an M×N array 400 of movable optical elements 401 (where M and N represent integer values from 1 to m and from 1 to n, respectively). Where the movable optical elements 401 are reflectors, such an array 400 can be incorporated into an optical switching device in accordance with the principles of the present invention. The array contains a plurality of movable optical elements 401 formed on the substrate or support structure of the array 400. These optical elements can comprise a wide range of optical components including, but not limited to reflectors (mirrors), blocking optics (which block the transmission of light), filters, gratings and lenses. Such movable optical elements serve a number of purposes and can be incorporated into numerous optical devices including optical switches. Such movable optical elements 401 can be movable about one axis or about two axes (so-called bi-axial optical elements). Throughout this patent these movable optical elements 401 will be discussed in the context of reflectors. It should be appreciated by those having ordinary skill in the art that the movable optical elements 401 described herein as reflectors can be interchanged with other optical elements, including but not limited to any of the aforementioned optical elements. Thus, the optical element array of FIG. 4(*a*) will be described as reflector array 400. Each reflector array 400 includes M×N reflector assemblies 401 formed on the substrate structure of the reflector array 400. The inventors contemplate many uses for such reflector arrays including, but not limited to single reflector array switching devices and two reflector array switching devices, as well as wavelength routers incorporating single or double reflector arrays.

FIG. 4(*b*) schematically illustrates aspects of a bi-axial reflector assembly 401 capable of deflection in two degrees of freedom. Embodiments for rotating in one degree of freedom are also contemplated by the inventors. The depicted reflector assembly 401 includes a reflective element 407, commonly referred to as a mirror. The mirror 407 is supported in a frame 408 by a pair of mirror hinges 404. The hinges depicted here are schematic in nature. The preferred hinge embodiments are discussed in greater detail below. The pair of mirror hinges 404 supports the mirror 407 such that an axis of rotation (here, for example, rotation about an X-axis) is defined. The frame 408 is supported in the substrate structure 405 of the reflector array 400 by another pair of frame hinges 406. Typically, the mirror 407 is positioned inside a recess in the substrate structure 405 of the reflector array 400 such that the mirror 407 has clearance to be tilted. Alternative embodiments for the mirror 407 position the mirror 407 so that it is raised above the surface of the substrate structure 405 of the reflector array 400.

The pair of mirror hinges 406 supports the frame 408 such that another axis of rotation (here, for example, rotation about a Y-axis) is defined. Typically, the pairs of hinges 404, 406 define substantially perpendicular axes of rotation. Thus, three-dimensional motion can be achieved in the reflector assemblies 401. Simpler, reflector assemblies can also be constructed. Such assemblies only rotate about a single axis. These reflector assemblies find utility in many applications including smaller optical switches and in so-called digital (on-off) switching arrays. Such arrays only require rotation about a single axis. Generally speaking, such reflector assemblies 401 are driven by electrostatic, electromagnetic, piezoelectric or thermal driving elements. Electrostatic actuators are commonly fabricated underneath the mirror 407 and frame elements 408. These driving elements are typically controlled by the control circuitry of the switch. The control circuitry that drives the driving elements can be formed directly underneath the driving elements as part of the fabrication process or elsewhere on the reflector array 400. Alternatively, the control circuitry that drives the driving elements can be formed completely separate from the array 407 and connected later.

FIG. 4(*c*) schematically illustrates driving elements (or drive elements) 407', 407", 408', and 408". In the depicted illustration, the drive elements are, for example, positioned beneath the moving parts. The driving elements 407', 407" rotate the mirror 407 about the X-axis, and driving elements 408', and 408" rotate the frame 408 about the Y-axis. The driving elements 407', 407", 408', and 408" are typically constructed of parallel plate capacitors. Driving control electronics can be included below driving elements 407', 407", 408', and 408" for larger reflector arrays and connected to the driving elements using, for example, vias. In other embodiments, the driving electronics can be on separate wafers and leads can be routed on the surface to the driving elements 407', 407", 408', and 408".

FIG. 4(*d*) is a cross section view of a portion of the embodiment shown in FIG. 4(*c*). The driving elements 407', 407", 408', 408" depicted in this embodiment is preferably constructed having a slightly smaller size than the frame 408 and reflector 407 elements. During operation, the frames and mirror elements have been known to rotate too much causing the outer edges of the frames and mirror elements to make mechanical contact with the underlying drive elements. This electrically short circuits the system and can permanently damage the system components. Thus, if the driving elements have a slightly smaller dimension, especially along the outer edges, excessive deflection of the frames and mirror elements will not result in shorting of the system. As depicted in FIG. 4(*c*), the drive elements are smaller (especially at the distal edges) than the movable elements, as indicated by the heavy boundary lines. Therefore, even if the movable elements contact the underlying structure there will be no electrical contact between the drive elements 407', 407" and the depicted reflector 407. The same can be said of drive elements 408', 408", and frame 408. Such sizing of the drive elements can be utilized with respect to all the embodiments set forth herein. Implementation in FIG. 4(*d*) has the gap 415 between mirror element 407 and frame 408 and driving elements 407', 407", 408' and 408" defined by the thickness of the wafer 412 minus thickness of mirror 407. When smaller gaps 416 shown in FIG. 4(*e*) are required, the bottom chip 414 with driving elements is etched with trenches 417. Metal coatings 410 and 411 are also shown in FIGS. 4(*d*) and 4(*e*). The frame 408 does not require metal coating as the silicon material is extrinsic, having dopants in silicon for all these devices. When wafer 414 is electrically conducting, dielectric film is deposited on its surface in areas where the physical contact occurs between 412 and 414 in order to electrically insulate parts 412 and 414.

Although depicted here as parallel plate electrostatic actuators, driving elements in accordance with the principles of the present invention may be of many different types of actuators known to those having ordinary skill in the art can be used. For example, other types of actuators such as electrostatic rotational comb actuators, electromagnetic actuators, piezoelectric actuators or thermally driven actuators can be used. Although the depicted embodiment shows the mirror 407 as circular, the mirror 407 can have any shape.

Hinge design is an important aspect of the high performance reflector assemblies. The length, width, thickness, and cross sectional shape of hinges determine the stiffness and consequently the driving signals (voltages in case of electrostatic actuators) required to achieve desired deflections in the reflectors and the desired frequency response of the actuator. The torsional hinge stiffness is proportional to hinge thickness, to the third power of hinge width and inversely proportional to hinge length. The bending hinge stiffness is proportional to the third power of hinge thickness, to hinge width and inversely proportional to hinge length. The hinge stiffness has to be low enough to provide sensitive deflections but also high enough to exhibit high frequency resonances. The hinge must also be robust enough to be manufactured with a high yield and withstand the conditions of a normal operating environment. Additionally, if the reflector was constructed so that both the mirror and the hinges have the same low thickness, the lack of flatness of the mirror would lead to excessive wavefront distortions in light reflected by the mirror. Consequently, in most cases, the mirror thickness will be greater than hinge thickness. Therefore, fabrication processes should be capable of generating these two different thicknesses. In addition, hinge width is limited by processing (lithography and etching) and reasonable widths do not lead to acceptably low stiffness, unless the length of hinges is much greater than that which straight hinges can provide.

Figure 5A:
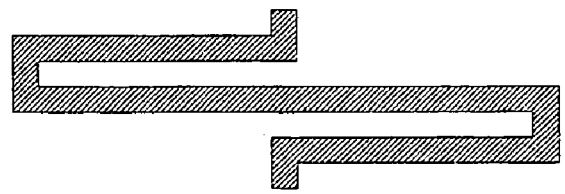
FIGS. 5(a)–5(e) are top down views of serpentine hinge embodiments in accordance with the principles of the present invention.
Figure 5B:
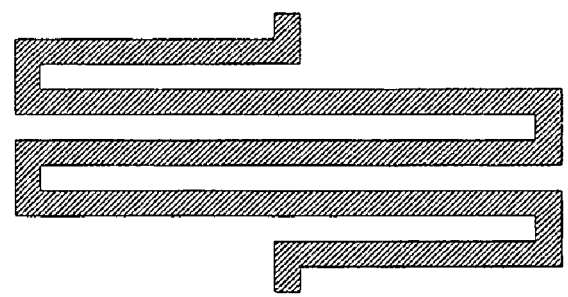
Figure 5C:
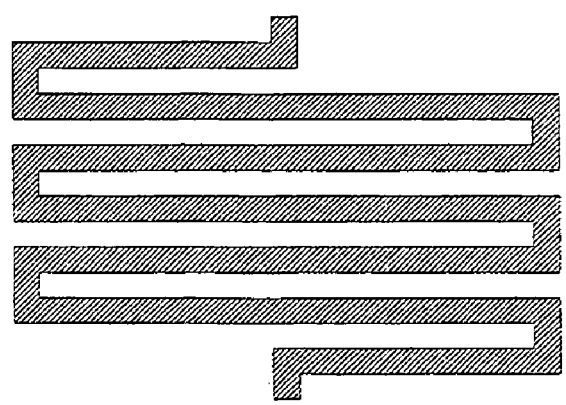
Figure 5D:
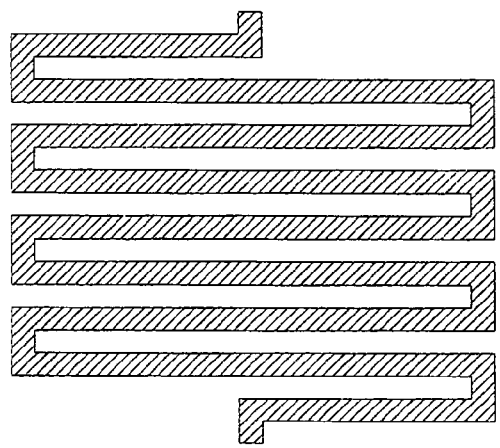
Figure 5E:
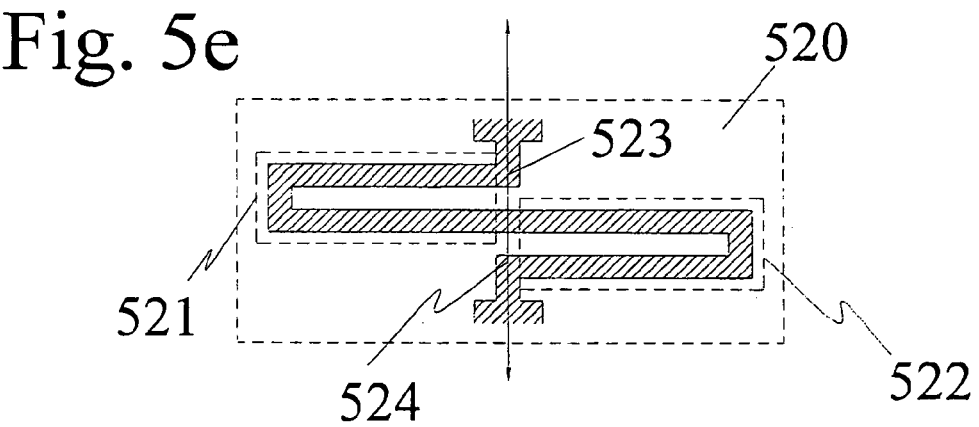
Figure 5F:
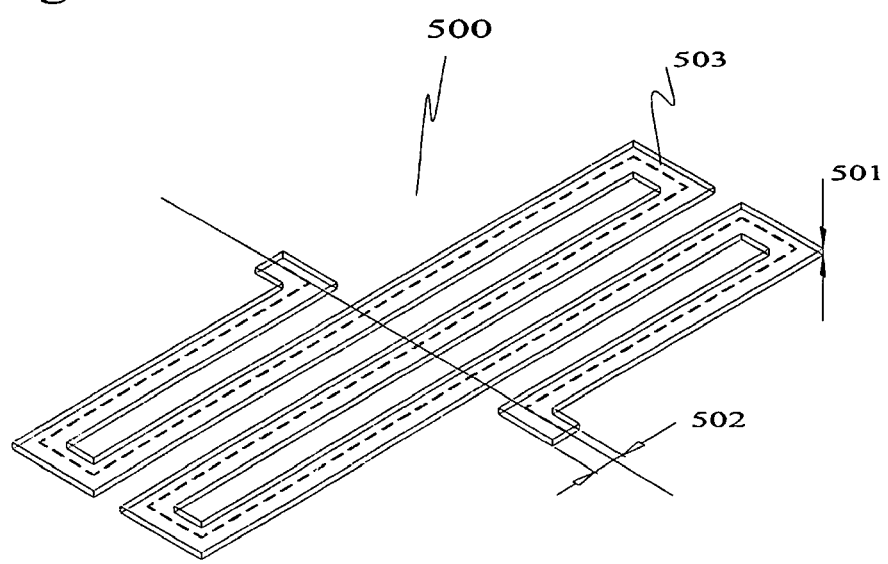
FIG. 5(f) is perspective view of a serpentine hinge embodiment in accordance with the principles of the present invention.

The principles of the present invention address this problem by using a serpentine hinge structure. Serpentine hinges can include one, two, three, four or more "windings". The inventors contemplate that n windings can be used in the hinges, where n is equal to or greater than one. FIGS. 5(a)–5(d) depict examples of such single (5(a)), double (5(b)), triple (5(c)), and quadruple (5(d)) serpentine hinges. FIG. 5(e) shows a single winding hinge 520. Each winding includes two arms (shown here inside the dashed line boxes 521, 522). In embodiments having many windings, the arms snake continuously from one arm to another for the entire length of the hinge. The windings include a pair of shafts 523, 524 which connect the hinges 520 to the larger array elements. The arms 521, 522 extend in a direction transverse to that of the axis of rotation for the hinge. FIG. 5(f) is a perspective view of a portion of a double serpentine hinge 500. The thickness 501 of the hinge typically ranges from about 3 (micron) to about 50 km. Thicker embodiments can be fabricated and, for some embodiments, are favored. However, the most preferred thickness is in the range of about 5–10 This is in comparison to a typical mirror embodiment which is in the range of about 10–50 thick. The width 502 of the hinge typically ranges from about 2 to about 10 Again, embodiments having greater widths can be fabricated. However, the preferred width is in the range of about 5–10 The length (defined here by the dashed line) 503 of the serpentine hinge 500 can be any length. Embodiments having lengths in the 100's or even 1000's of microns being preferred. Of course, the length 503 of the serpentine hinge 500 depends on the number of windings in the hinge.

Damping is an advantageous feature that can add to the utility of each of the embodiments disclosed herein. One example of such a means is a thin coating of a damping agent applied onto the hinges. Such damping agents when dried (or cured) act as a damping factor which reduces resonances in the optical structures disclosed herein. Such damping agents are typically polymeric materials. Suitable materials include, but are not limited to silicones and elastomer materials for example, di-methylsilicone, polyurethane, polyisobutene-co-isoprene, and polybutadiene-co-acrylonitrile. Such damping agents are coated onto the hinges and cured. Alternatively, the damping agents are dried until the volatile constituents outgas. Typically, such damping agents are applied onto the hinges and part of the adjoining support structures. Such damping agents can be applied using, for example, an ink jet dispensing in any desired pattern and quantities over the hinge surfaces. Curing can be with room temperature, elevated temperature or exposure to ultraviolet radiation, electron beams, or a combination of these methods. In some embodiments, the damping agent is applied to the hinge in smaller quantities, forming isolated "islands" of damping material on the surface of the hinges. The amount of material applied to the hinges can depend on many factors, including, material type, amount of adjustment necessary, thickness of material, method of application, and other factors.

Figure 5G:
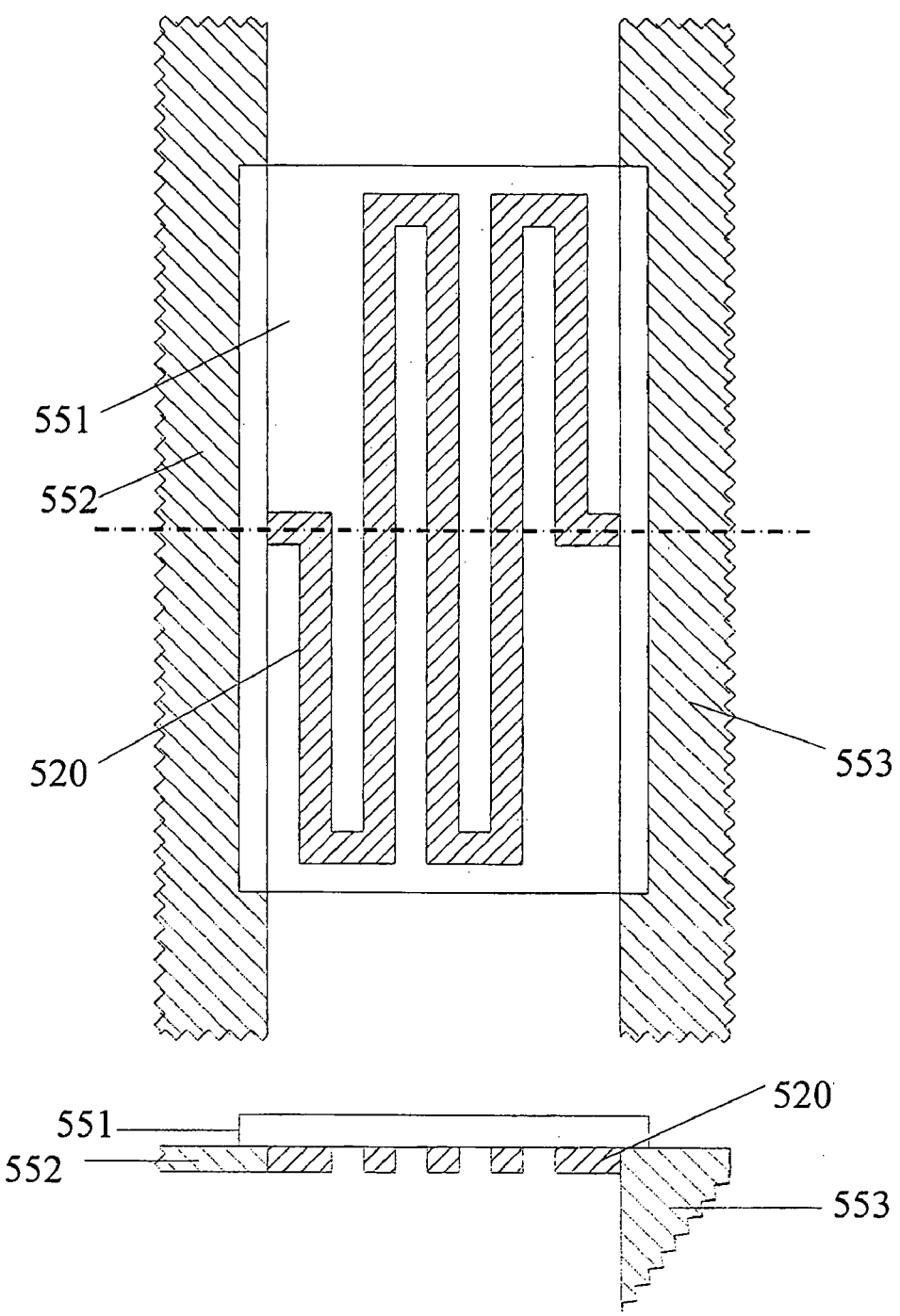
FIGS. 5(g), 5(h) and 5(i) are plan and cross-sectional views of the hinge embodiments having damping material applied in accordance with the principles of the present invention.

FIG. 5(g) is a drawing showing a layer of the viscoelastic material 551 applied over the hinge 520 between the frame 552 and the adjoining support structure 553. This material is applied to fine tune the device performance after its fabrication by providing means of adjusting the damping while monitoring the device characteristics. The viscoelastic sheet has an adhesive coating on one side and the appropriately sized pieces are applied over the hinge area.

Figure 5H:
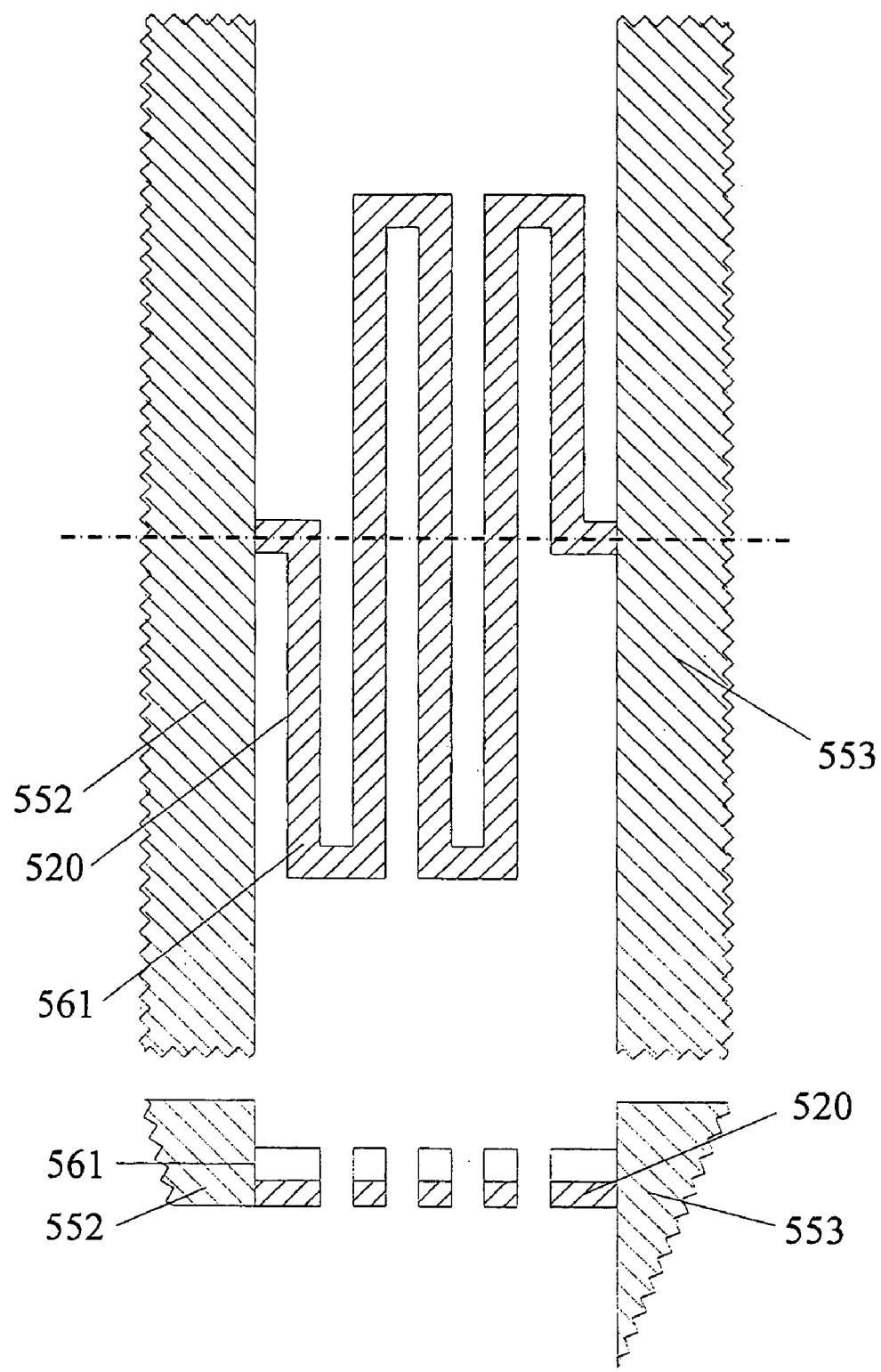

FIG. 5(h) shows a variation on the use of the viscoelastic material 561 so as to cover only the area of the hinge 520. Application method is based on ink jet dispensing in any desired pattern and quantities over the hinge surfaces. Curing can be with room temperature, elevated temperature or exposure to ultraviolet radiation, or a combination of these methods.

Figure 5I:
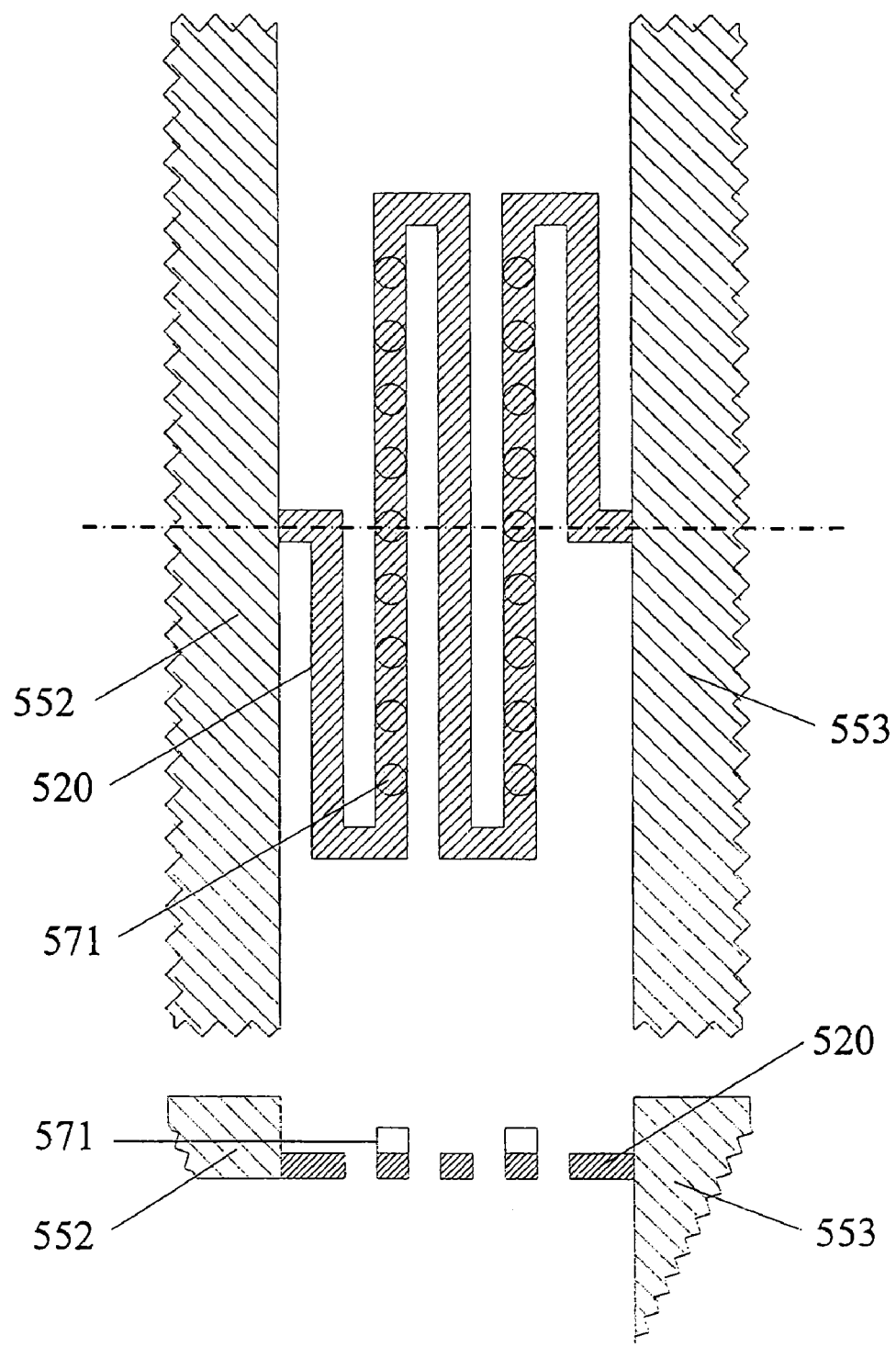

FIG. 5(i) shows yet another variation on the extent of coverage of the viscoelastic material 571 over the hinge 520. In this case the material is applied to the hinge in smaller quantities, forming isolated islands 571. The amount of material applied to the hinge will depend on many factors, including, material type, amount of adjustment necessary, thickness of material, method of application, and other factors. Some examples of the elastomer materials are Di-methylsilicone, polyurethane, polyisobutene-co-isoprene, and polybutadiene-co-acrylonitrile.

Figure 6A:
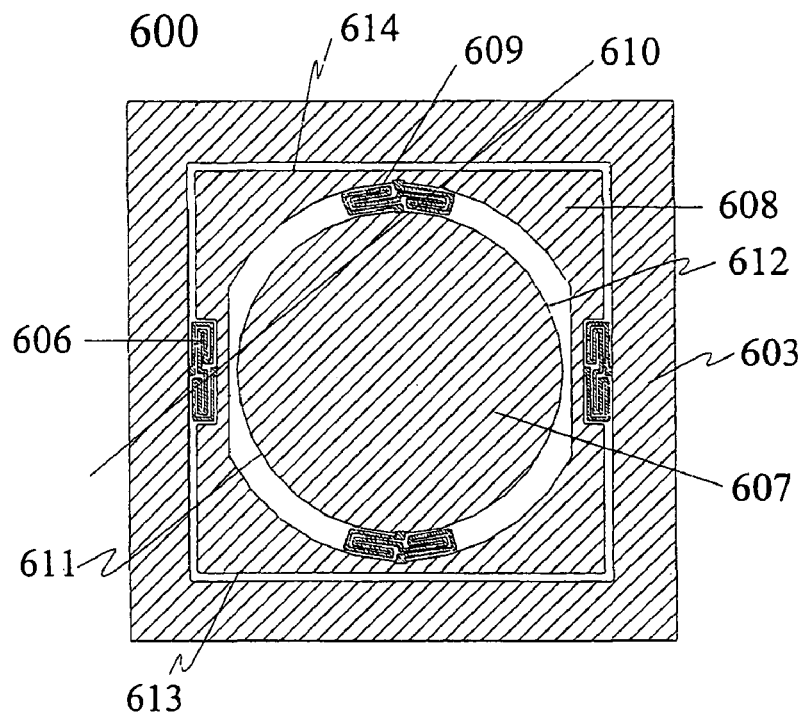
FIGS. 6(a) and 6(b) are plan views of a reflector assembly embodiment in accordance with the principles of the present invention particularly depicting frame, mirror, and serpentine hinge elements and the associated underlying driving elements.
Figure 6B:
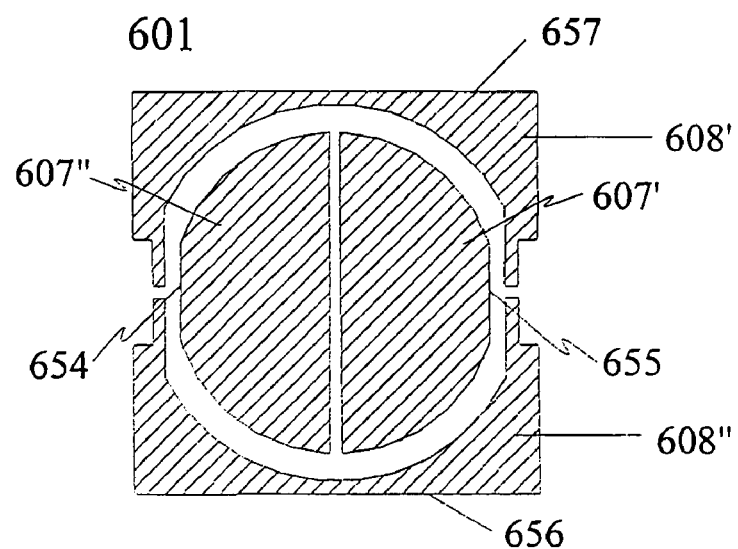

FIG. 6(a) is a plan view illustrating one embodiment of a reflector assembly 600 in accordance with the principles of the present invention. The mirror 607 is held in the frame 608 by a pair of serpentine mirror hinges 609 (or mirror hinges). The serpentine mirror hinges 609 are depicted as having two windings. Other embodiments can include 1 to n windings. The frame 608 is suspended in the array substrate 603 by a second set of serpentine hinges 606 (also referred to as frame hinges). As with the mirror hinges 609, the frame hinges 606 can comprise from 1 to n windings FIG. 6(b) shows a drive assembly 601 which lies just underneath the mirror/frame/hinge structure depicted in FIG. 6(a). FIG. 6(b) depicts the drive elements 607', 607", 608', and 608" that are the components of electrostatic actuators. The drive elements 607', 607" interact with the mirror 607 to provide positive and negative deflection about a axis. The drive elements 608', 608" interact with the frame 608 to provide positive and negative deflection about an X-axis. The drive elements 607', 607", 608', and 608" are shaped such that they do not interfere with the hinges 609 and 606. This typically means that the drive elements 607', 607", 608', and 608" are not formed under the hinges. Also, it is preferred that the drive elements 607', 607", 608', and 608" be sized such that, in the event of excessive deflection of the movable mirror and frame components, no contact is made between the drive elements and the movable components. This is typically avoided by reducing the size of the drive elements such that the outer edges of the movable components will not contact the drive elements even in the event of excessive deflection. Thus, the drive elements 607', 607", 608', and 608" are slightly smaller, in the regions 654, 655, 656, 657, respectively, than the overlying mirror 607 and frame 608. Such precautions can be implemented into each embodiment discussed herein.

Figure 7A:
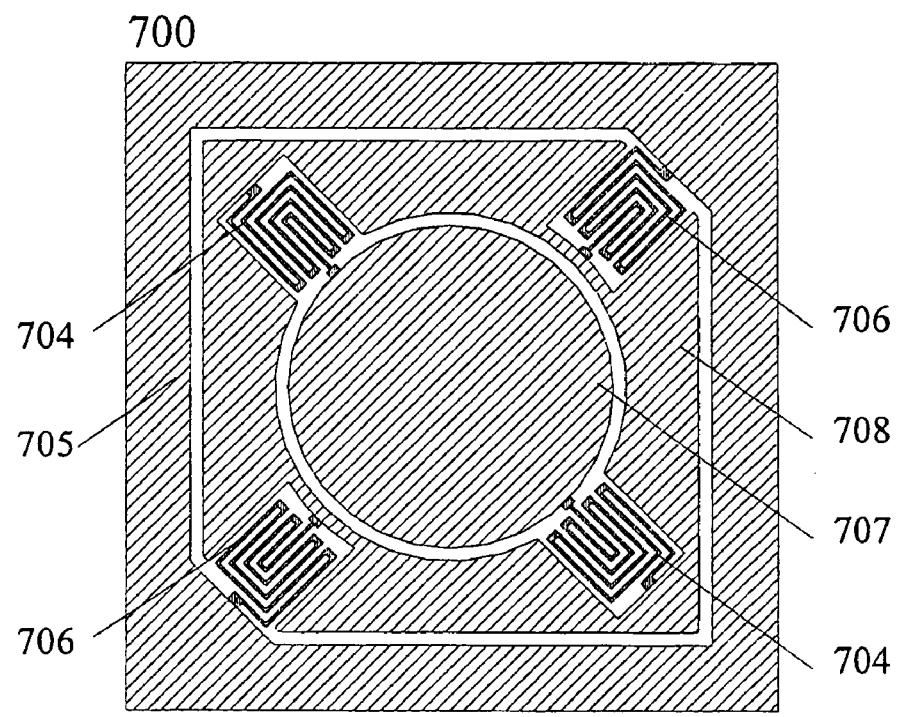
FIGS. 7(a) and 7(b) are plan views of another reflector assembly embodiment in accordance with the principles of the present invention particularly depicting frame, mirror, and radial serpentine hinge elements and the associated underlying driving elements.
Figure 7B:
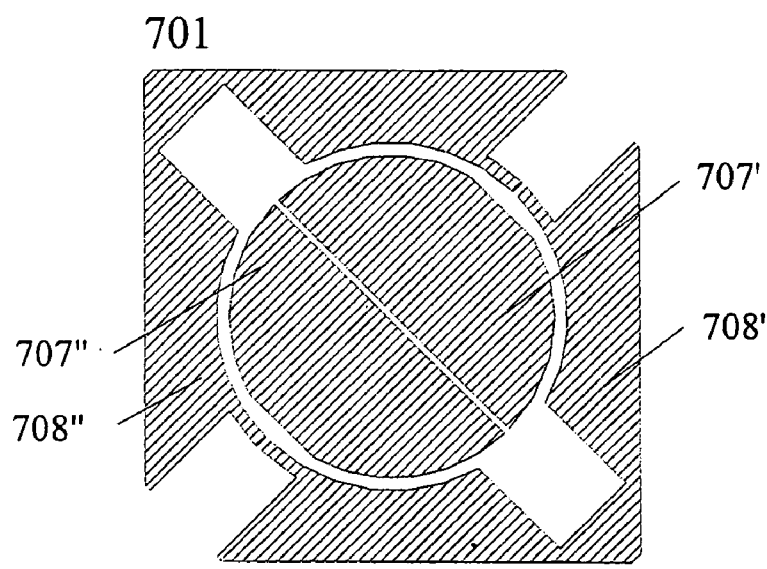
Figure 7C:
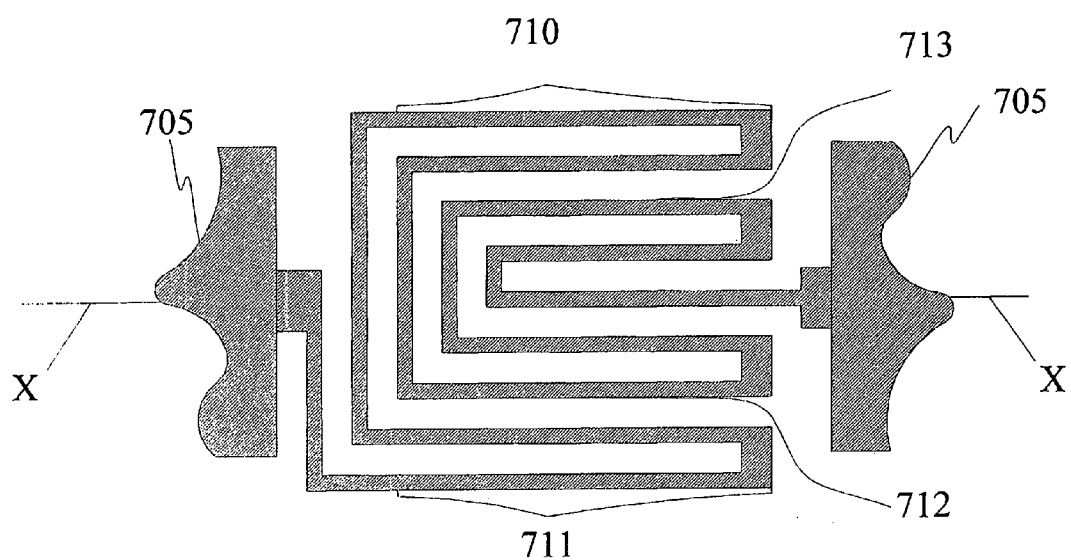
FIG. 7(c) is a plan view of a radial serpentine hinge in accordance with the principles of the present invention.

Another advantageously constructed embodiment is depicted in FIG. 7(a). This embodiment meets the challenge of packing the mirror 707, two sets of hinges 704 and 706, and frame 708 into as small an area as possible, so that optical components can be smaller and the overall dimensions of the cross connect switching system can be reduced. FIG. 7(*b*) shows a layer of the reflector assembly 701, which is formed just underneath the mirror/frame/hinge structure depicted in FIG. 7(*a*). FIG. 7(*b*) depicts the drive elements 707', 707", 708', and 708". As discussed above with respect to the embodiment of FIG. 6, the drive elements 707', 707" interact with the mirror 707 to provide deflection about a first axis. And the drive elements 708', 708" interact with the frame 708 to provide deflection about a second axis. The fabrication of such structures will be discussed in some detail hereinbelow.

With continued reference to FIG. 7(*a*), by packing more optical components on a given reflector array, smaller arrays may be constructed. Smaller reflector arrays allow a larger number of devices to be built on a given wafer, thus reducing the cost of these reflector arrays and the deflection angles required for switching. Furthermore, smaller structures have higher resonance frequencies, which improve switching and addressing times for the reflector array. Also, smaller reflector arrays enable shorter optical paths within switching devices. Due to the shorter optical paths possible with such embodiments, lower resolution position sensing systems can be used, thereby reducing cost. The depicted pairs of serpentine hinges 704, 706 each have two windings. In order to achieve more compact serpentine hinges, portions of the windings are folded into a rectangular conformation, with the arms of each winding being fabricated to include proximal folds that are oriented such that they are parallel to the axis of rotation. An embodiment of such a radial serpentine hinge 704 is depicted in FIG. 7(*c*). The hinge 704 permits rotation (shown by the arrow) of the mirror 707 about axis of rotation. In the previous embodiment, the arms of each winding extend in a direction transverse to the axis of rotation. In the depicted embodiment, the arms 710, 711, 712, 713 of each winding are formed such that a portion of the arms (also referred to as the folded portion) extends approximately parallel to the axis of rotation. In the depicted embodiment, the inner folded arms (e.g., 712 and 713) are shorter than the outer folded arms (e.g., 710 and 711). In other embodiments having more windings, the arms are progressively longer and longer, the further the folded arms are from the axis of rotation x. One objective of "folding" the windings is to maintain the length of the hinge in a more compact space. Thereby, the desired degree of flexibility in the hinge is maintained in a small space. Another way of describing the pairs of radial serpentine hinges 704, 706 is to say that the windings of the hinges have parallel arms. This means that the arms of the hinges extend in a direction substantially parallel to the axis of rotation. This is in contrast to the arms of an embodiment like that depicted in FIG. 5(*a*) where the arms can be said to be transverse to the axis of rotation.

Figure 8A:
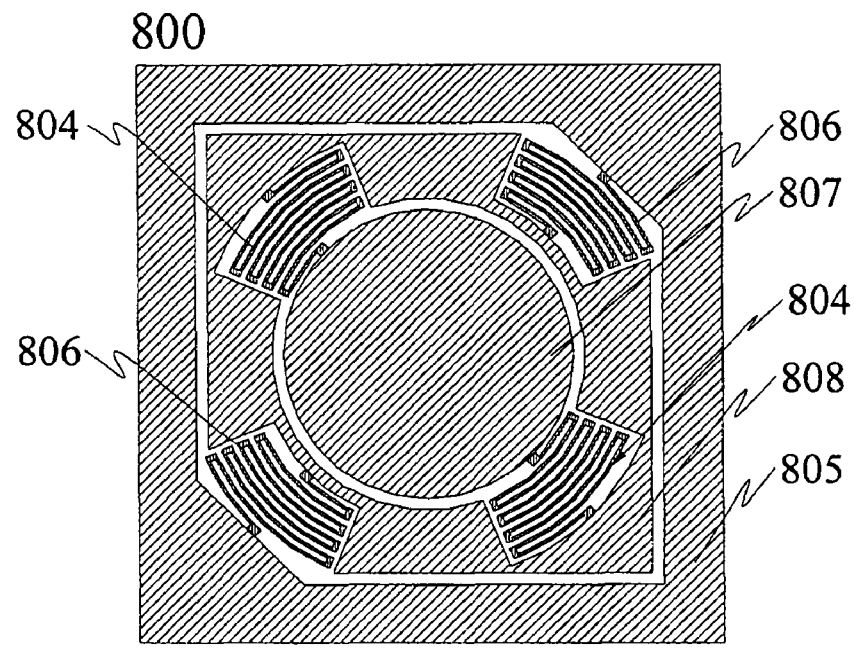
FIGS. 8(a) and 8(b) are plan views of another reflector assembly embodiment in accordance with the principles of the present invention particularly depicting frame, mirror, and circumferentially curved serpentine hinge elements and the associated underlying driving elements.
Figure 8B:
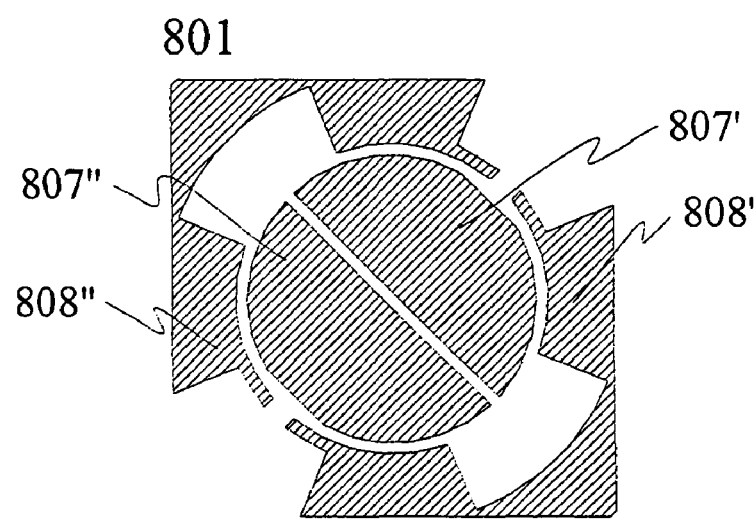

Another embodiment 800 is depicted in FIG. 8(*a*). This embodiment is also capable of compactly arranging a mirror 807, two sets of hinges 804 and 806, and frame 808 into as small area as possible. In the depicted embodiment the pairs of serpentine hinges 804, 806 are circumferentially curved. Such circumferentially curved serpentine hinges 804, 806 are generally contoured to coincide with the shape of the outside edge of the mirror 807. Each of the depicted circumferentially curved serpentine hinges 804, 806 has four windings comprising a circumferentially curved "quad" serpentine hinge. As with the other embodiments the hinges can have any number (n) of windings.

FIG. 8(*b*) shows a layer 801 of the reflector assembly 800 which lies just underneath the mirror/frame/hinge structure depicted in FIG. 8(*a*). FIG. 8(*b*) depicts the drive elements 807', 807", 808', and 808'. As with the previous embodiments, the drive elements 807', 807" interact with the mirror 807 to provide deflection about a first axis. Also, the drive elements 808', 808' interact with the frame 808 to provide deflection about a second axis.

Figure 9A:
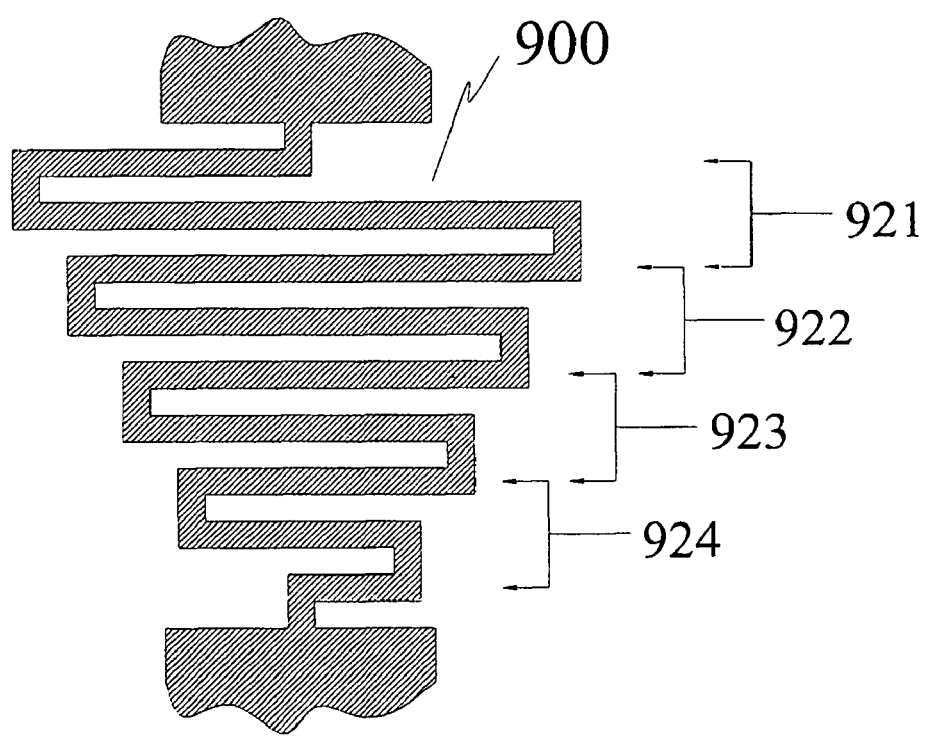
FIG. 9(a) is a plan view of a variable spring constant serpentine hinge embodiment in accordance with the principles of the present invention
Figure 9B:
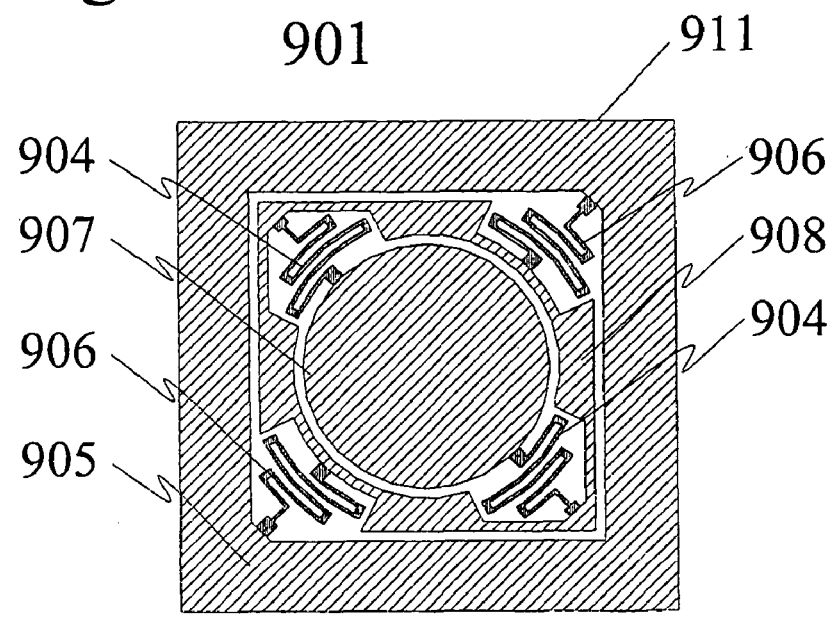
FIGS. 9(b) and 9(c) are plan views of another reflector assembly embodiment in accordance with the principles of the present invention particularly depicting frame, mirror, and circumferentially curved variable spring constant serpentine hinge elements and the associated underlying driving elements.
Figure 9C:
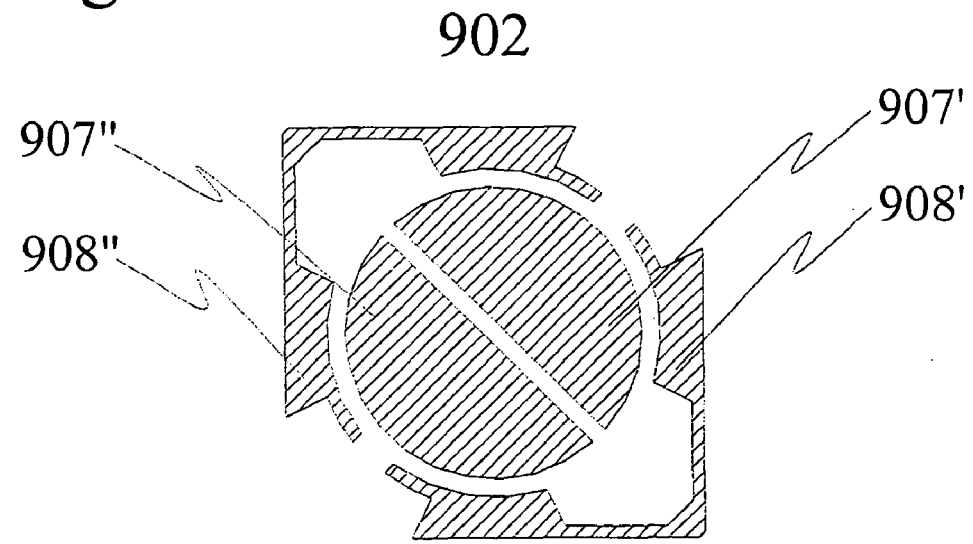

FIG. 9(*a*) illustrates another preferred hinge embodiment. The depicted hinge 900 is a variable spring constant serpentine hinge. Such a variable spring constant serpentine hinge causes vibrational damping in the hinge. In some embodiments the implementation of such damping means is highly desirable. The depicted hinge 900 includes four windings. The hinge 900 begins with the longest arms on the winding at one end of the hinge 900 and the shortest arms at the other end of the hinge 900. The arms of each successive winding are progressively shorter than that of the previous winding. Thus, winding 922 is shorter than winding 921. In like manner, winding 923 is shorter than winding 922 and winding 924 is shorter than winding 923. Such variable spring constant serpentine hinges 900 improve the resonant and vibrational behaviour of the optical elements suspended by the hinges. As with other hinges discussed herein, the number of windings is variable and determined by the designer prior to fabrication. The variable spring constant serpentine hinges 900 can be applied to any of the embodiments discussed herein. Such hinges have particular utility when applied to embodiments like that depicted in FIG. 9(*b*).

FIG. 9(*b*) depicts a reflector assembly embodiment 901 having pairs of variable spring constant serpentine hinges 904, 906. As with the embodiment of FIG. 8(*a*) the hinges are circumferentially curved. In addition to being generally contoured to coincide with the shape of the outside edge of the mirror 907, the circumferentially curved serpentine hinges 904, 906 are constructed such that they demonstrate a variable spring constant in the hinges. Each of the hinges 904, 906 of depicted embodiment includes two windings. As with all of the other embodiments discussed herein, the hinges can comprise any number of windings. In the depicted embodiment, the arms of the windings nearest to the mirror 907 are longer than the arms of the windings further from the mirror 907. In embodiments having a greater number of windings in the hinges, the windings are formed of progressively shorter arm lengths until the desired resonance and vibration behavior is obtained for the hinge. FIG. 9 shows driving electrodes corresponding to reflector in FIG. 9(*b*). Electrodes 907' and 907" are used to deflect the mirror 907 while electrodes 908' and 908" are used to deflect the frame 908.

Another reflector assembly 1000 embodiment is depicted in FIG. 10(*a*). FIG. 10(*a*) depicts an embodiment utilizing combinations of serpentine hinges 1071, 1072 and short straight hinges 1081, 1082. FIG. 10(*a*) is a plan view illustrating one embodiment of a reflector assembly 1000 in accordance with the principles of the present invention. As with the previous embodiments, the reflector assembly 1000 typically is incorporated into an array of reflectors. Each reflector assembly 1000 is fabricated on a reflector array substrate 1065.

The embodiment 1000 includes a first frame 1010 which connected to the substrate 1065 by a pair of first serpentine frame hinges 1071 which allows the first frame 1010 to rotate about a first axis defined by the first serpentine frame hinges 1071. The first frame 1010 is constructed having an inside periphery 1100 and an outside periphery 1100'. The first serpentine frame hinges 1071 connect the outside periphery 1100' of the first frame 1010 to the substrate 1065. Positioned inside the first frame 1010 is a second frame 1008. The second frame 1008 includes an inside periphery 1080 and an outside periphery 1080'. The second frame 1008 is suspended and supported by a pair of first straight hinges 1081 that allow the second frame 1008 to rotate about an axis substantially parallel to the first axis defined by the pair of first serpentine frame hinges 1071. Positioned inside the second frame 1008 is a third frame 1009. The third frame 1009 also includes an inside periphery 1090 and an outside periphery 1090'. The third frame 1009 is suspended and supported by a pair of second serpentine frame hinges 1072 which connects the outside periphery 1090' of the third frame 1009 to the inside periphery 1080 of the second frame 1008. The pair of second serpentine frame hinges 1072 allows the third frame 1009 to rotate about a second axis defined by the pair of second serpentine frame hinges 1072. The second axis is typically transverse to the first axis. In a preferred embodiment the second axis is at a substantially right angle to the first axis. Positioned inside the third frame 1009 is a mirror 1007. The mirror 1007 includes an outside periphery 1070. The mirror 1007 is suspended and supported by a pair of second straight hinges 1082 that allows the mirror 1007 to rotate about an axis substantially parallel to the second axis defined by the pair of second serpentine frame hinges 1072.

Figure 10B:
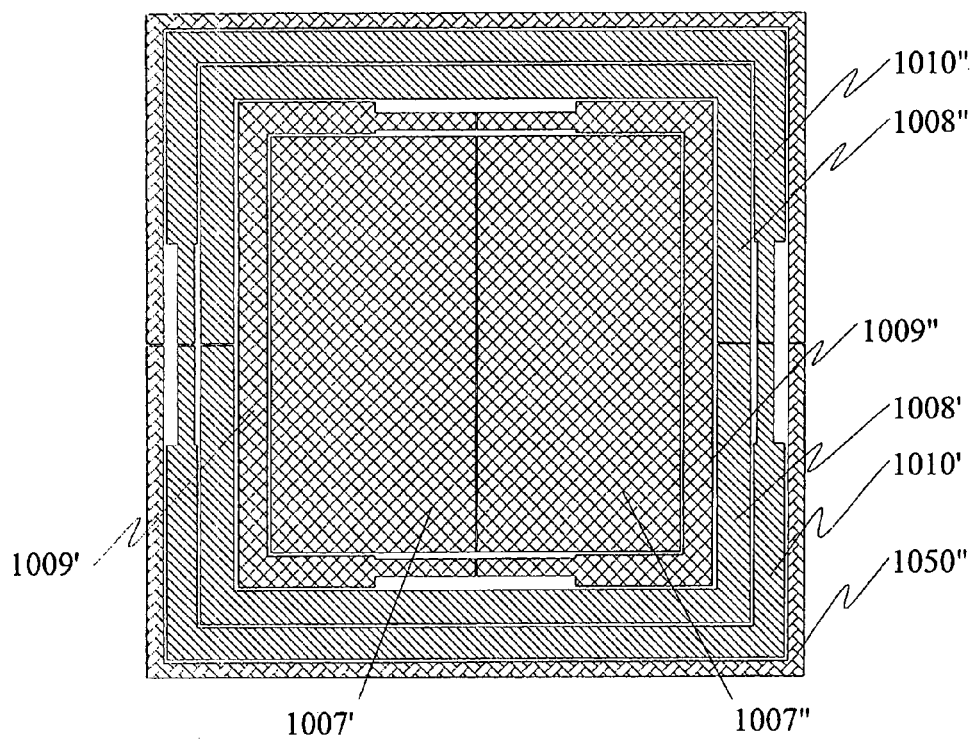

FIG. 10(b) shows a layer of the reflector assembly embodiment 1001 which lies just underneath the mirror/frame/hinge structure depicted in FIG. 10(a). FIG. 10(b) depicts the multiple drive elements of the embodiment 1001.

Drive elements 1007' and 1007" interact with the mirror 1007 to provide positive and negative deflection about the second axis. Drive elements 1009' and 1009" interact with the third frame 1009 to provide added positive and negative deflection about the second axis.

Drive elements 1008' and 1008" interact with the second frame 1008 to provide positive and negative deflection about the first axis. Drive elements 1010' and 1010" interact with the first frame 1010 to provide added positive and negative deflection about the first axis.

As previously discussed, the drive elements are shaped and sized such that they do not interfere with the operation and range of motion of the hinges 1071, 1072, 1081, 1082. This typically means that the drive elements 1007', 1007", 1009', 1009", 1008', 1008", 1010', and 1010" have small cut out regions under the hinges such that they do not impede hinge operation. Also, as previously discussed, the drive elements 1007', 1007", 1009', 1009", 1008', 1008", 1010', and 1010" can be sized such that in the event of excessive deflection of the movable components (e.g., the mirror and frames), no contact is made between the drive elements and the movable components of the reflector assembly 1000.

The inventors contemplate that the serpentine hinges (e.g., hinges 1071, 1072) shown in the embodiments depicted in FIG. 10(a) and FIG. 10(b) can easily be replaced by other serpentine hinge designs. For example, suitable replacements can be the radial serpentine hinge 704 depicted in FIG. 7(a) or the variable spring constant serpentine hinge 900 of FIG. 9(a). Such embodiments are to be taken as illustrative examples rather than limitations. Also, the hinges of the embodiments depicted FIGS. 10(a) and 10(b) can be treated with damping agents to improve vibrational and resonance behavior.

The structures disclosed herein can be can be fabricated out of silicon based materials using MEMS surface or bulk micromachining technologies. Examples of such fabrication techniques are discussed in many standard references. Examples include "Silicon Micromachining" (1998) by Elwenspoek, M. and Jansen, H. V.; "An Introduction to Microelectromechanical Systems Engineering" (2000) Nadim, M.; "Handbook of Microlithography, Micromachining, and Microfabrication" (1997) Rai-Choudhury, P. Also, a suitable method of manufacture is discussed in the paper "A Flat High-Frequency Scanning Micromirror" (2000) Solid-State Sensor & Actuator Workshop, Hilton Head, S.C., Jun. 4–8, 2000 by Conant, R. A., Nec, J. T., Lau, K. Y., and Muller, R. S.

Extension of these general fabrication principles from uni-axial actuators to bi axial actuators, and from structures where both the reflector and the hinge have the same thickness to devices where the reflector and hinge thicknesses are different presents a challenging fabrication problem. This is important because, it is desirable to have relatively thin hinges, otherwise the hinge stiffness can be too high requiring large torque to produce the desired deflection angles, which in turn leads to high driving signals. However, if the same low thickness is used for the reflectors, metal coating stress and/or oxide stress can result in excessive mirror distortion. Therefore, a fabrication process that permits the decoupling of reflector and hinge thicknesses is advantageous. In addition, release and separation of these fragile bi-axial actuators requires special release and separation techniques.

FIGS. 11(a)–11(m) illustrate a series of cross-section views of a substrate at selected points in a fabrication process. The process is depicted with respect to, for example, the device shown in FIG. 6(a) with cross section along line 610. The depicted fabrication process embodiment can be used to construct bi-axial actuators having hinge thickness less than reflector thickness. Alternatively, the hinges can be fabricated having hinge thickness approximately the same as reflector thickness. Also, the depicted embodiment is shown having serpentine hinges. The same processes can be used to fabricate ordinary torsional or bending hinges.

Figure 11:
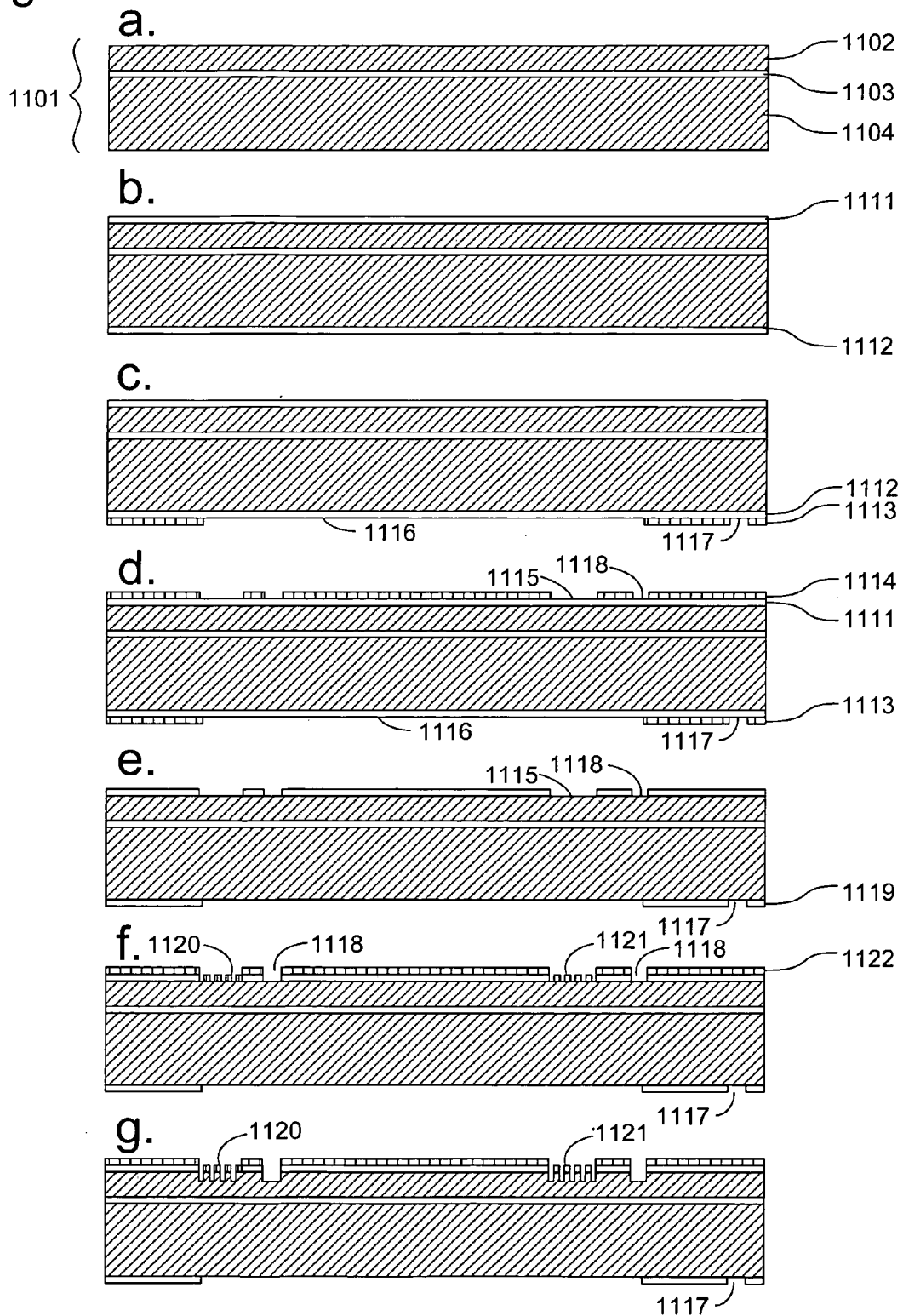
FIGS. 11(a)–11(m) depict a series of cross-section views of a substrate upon which a reflector embodiment is being formed in accordance with the principles of the present invention, each Figure illustrating various steps of a fabrication process.
Figure 11:
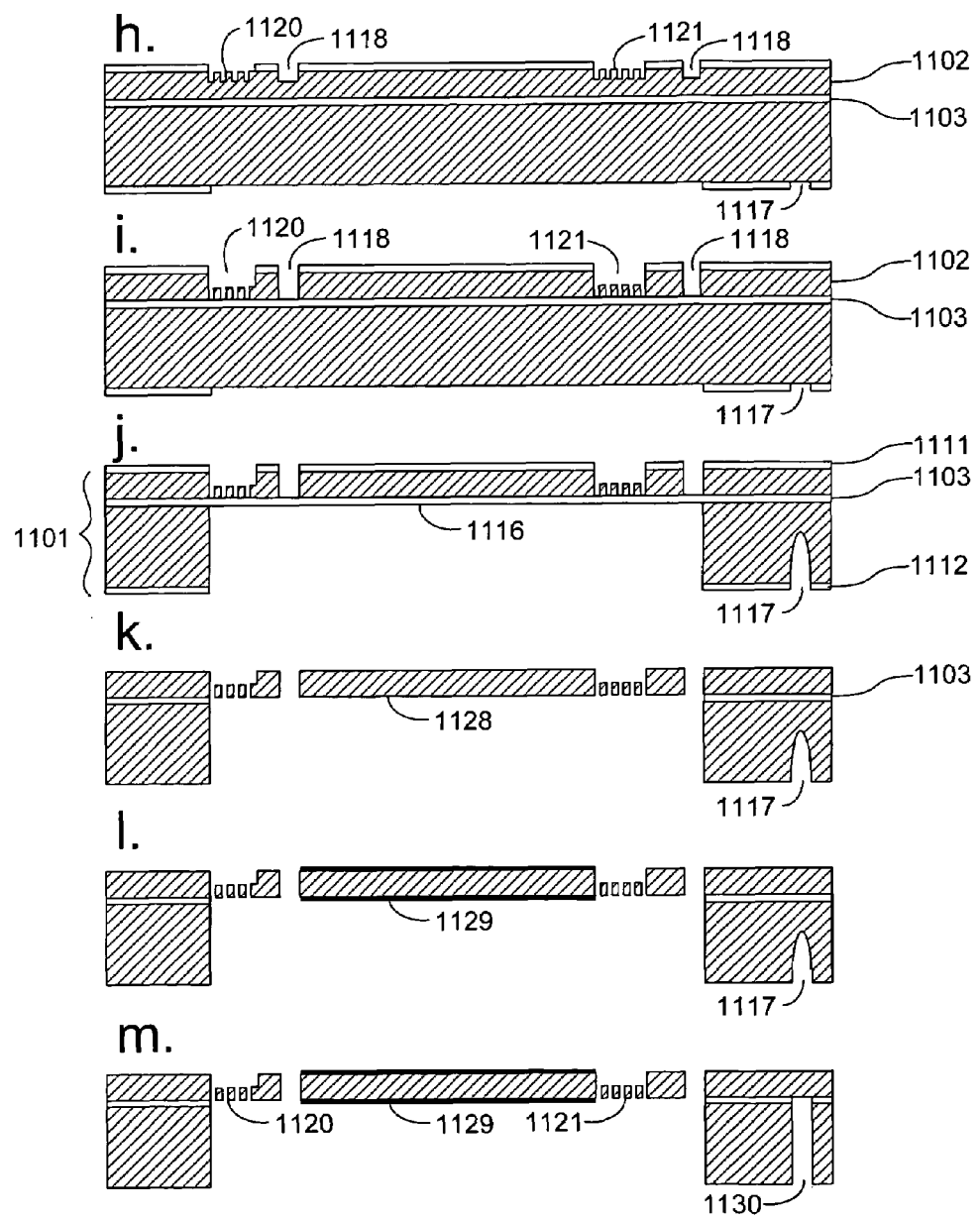

The depicted method embodiment illustrates a fabrication method using a single layer silicon-on-insulator (SOI) wafer. Referring to FIG. 11(a), a suitable single layer SOI wafer 1101 can be fabricated by oxidation and bonding of silicon wafers 1104. These wafers can be treated using known processes to produce SOI wafer 1101 having a device silicon layer 1102, internal oxide layer 1103, and silicon wafer layer 1104. A typical thickness of wafer 1104 being on the order of about 300 to 500 um, although wafers having other thicknesses can be used. The internal oxide layer 1103 is fabricated on the wafer layer 1104. The oxide layer 1103 can be fabricated by a variety of processes known to those having ordinary skill in the art to a thickness of less than 2 um. The device silicon layer 1102 can then be fabricated on the oxide layer 1103 by grinding, lapping and polishing to a thickness in the range of about 1 um to 100 um, with 20 to 50 um being preferred. Other fabrication methods of SOI wafers can also be employed with particular emphasis on fabrication processes that permit the layer 1103 to be of low stress. Layer 1103 can be fabricated using materials other than silicon dioxide, such materials include, but are not limited to silicon nitrides, silicon oxynitrides, aluminum oxides, and other materials that form good bonding with silicon and are good etch stops in reactive ion etching of silicon.

In FIG. 11(b) both sides of the SOI wafer are treated to form a top oxide film layer 1111 and a bottom oxide film layer 1112. The top oxide film layer 1111 and a bottom oxide film layer 1112 are typically each formed to a thickness of less than or equal to 3 um.

In FIG. 11(c) a bottom photoresist layer 1113 is formed on the bottom oxide film layer 1112. The photoresist layer 1113 has openings defining a bottom pocket 1116 and a separation line 1117. In FIG. 11(d) a top photoresist layer 1114 is formed on the top oxide film layer 1111. The top photoresist layer 1114 also has openings 1115 and 1118 formed therein.

FIG. 11(e) illustrates the top and bottom oxide film layers 1111 and 1112 after oxide material has been removed in a first etching operation. Material is removed in the openings 1115, 1116, 1117, 1118 in the photoresist layers 1113 and 1114. Typically, this is accomplished using etching techniques known in the art. In one embodiment, this etching of the oxide layers 1111 and 1112 is accomplished using wet etching techniques. As is known to one of ordinary skill in the art, dry etch techniques can be used.

FIG. 11(f) illustrates the formation of a second top photoresist layer 11122. The second top photoresist layer 1122 is formed over remaining top oxide layer 1111 and over portions of the exposed device silicon layer 1102 in hinge regions 1120, 1121 (region 1115 of FIG. 11(d)). Certain areas 1118 of exposed device silicon layer 1102 are not masked. The second top photoresist layer 1122 is patterned in the hinge regions 1120, 1121 to permit the formation of hinges by etching.

FIG. 11(g) shows the effect of a second etching (material removal) operation. This operation is typically accomplished using etching. In particular, reactive ion etching (RIE) or other directional etching techniques are preferred. This etch step defines the thickness of hinges in regions 1120 and 1121, and also defines the difference between reflector thickness and hinge thickness. With reference to FIG. 11(h) the top photoresist layer 1122 is removed.

FIG. 11(i) illustrates a third etching operation. The top oxide layer serves as a hard mask over the device silicon layer 1102. The exposed regions of the device silicon layer 1102 are etched. In particular, in hinge regions 1120, 1121 (of FIG. 11(g)) and the exposed areas 1118. Such etching should be accomplished using RIE or other directional etch techniques. In this way the patterned hinge areas 1120, 1121 will maintain their pattern and maintain their differential thickness with respect to reflector thickness. The internal oxide layer 1103 serves as an etch stop for the third etch operation.

FIG. 11(j) illustrates a fourth etching (or material removal) operation. The bottom surface of the SOI wafer 1101 is etched through openings in the bottom oxide layer 1112. The fourth etch removes material to form a pocket in region 1116 and to define separation lines in region 1117. The material can be removed by etching, preferably using REI or other directional etching techniques known to those having ordinary skill in the art. Again, the internal oxide layer 1103 serves as an etch stop for the fourth etch operation.

FIG. 11(k) illustrates a fifth etching (or material removal) operation. The fifth etch removes the internal oxide layer 1103 by backside etching. Etching techniques known to those having ordinary skill in the art may be used. FIG. 11(l) depicts the forming of a reflective layer 1129 on one or both sides of the movable optical element 1128. The reflective layer can be formed using a wide variety of materials and techniques known to one of ordinary skill in the art. One process includes forming a metal reflective layer 1129 on at least one of the top and bottom surfaces of the movable optical element 1128. A suitable metallization material includes, but is not limited to gold. Adhesion layers, such as chromium, titanium or tantalum may be employed. A wide variety of deposition techniques can be used to form the metal reflective layers 1129, for example, double sided sputtering.

FIG. 11(m) depicts a sixth etching operation used to remove material in the region 1117 to complete the separation line 1130. This allows the actuators to be released from the substrates in arrays of desired size. An earlier etching of these lines would lead to a premature separation of the wafer into arrays. Once separated, the separated arrays can then be coupled and aligned with a mated wafer having formed thereon interconnect circuitry, driving electronics, and control circuitry. These completed arrays are hermetically sealed in packages.

The order of the steps can be altered without departing from the principles of the invention. The use of oxide masks can be substituted with additional photoresist masks. Also, low-stress dielectric materials in layer 1103 facilitate release of structures from the wafer. Also, it is preferable to use low stress materials for the internal etch stop layers. Such materials include low stress silicon oxides on the order of about 10–100 MPa. Sputtering or plasma enhanced chemical vapor deposition processes that provide very low stress are used rather than thermally deposited oxides. Because hinges are fabricated from single crystal silicon, creep and fatigue are minimized and reliability is improved as compared with devices that use hinges made with polysilicon, metal and metal alloys in surface micromachining. Rotational comb designs have leads incorporated on movable electrodes and no bottom electrodes are required. The interconnections between the top and bottom wafers are fabricated using, for example, solder reflow or other techniques.

It should be noted that the optical devices formed on the wafers are very delicate. Care must be taken in separating the wafer into its component arrays. One approach for separating the very sensitive actuators into individual arrays (dies) is performed in combination of three steps. First, separation lines are defined lithographically or with shadow masking and dry etched, usually using standard deep reactive ion etching of silicon. The etch depth is chosen such that the wafer containing the actuators retains its rigidity but does not separate into individual dies. In the next step, deeper cuts are made along separation lines with laser cutting. The cut depth is controlled by pulse energy, pulse rate, number of pulses and translational speed of the substrate or laser beam. It is desirable to use lasers with very short pulse duration as shorter pulses reduce size and amount of particulate contamination. In addition, short wavelength lasers are used in order to provide sufficient absorption of laser energy by the material desired to be cut. Examples of the appropriate lasers are tripled or quadrupled neodymium YAG and Ti sapphire. With very short laser pulses, only gaseous by-products form during cutting and thus particulate contamination can be eliminated. Photochemical laser cutting can also be employed. A small thickness of material is left remaining in the trenches so that particulate and/or gaseous contamination does not collect on the more critical surfaces (e.g. optical reflecting surfaces) during laser of the device. The final step involves cleaving this remaining material with a small amount of torque applied to separate the arrays. An alternative separation process can use only dry etching in combination with cleaving or laser cutting followed by cleaving. A preferred approach includes all three process steps. Additionally, these techniques, either individually or in combination, can be used to effect device separation from both the front and the backside of the wafer.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. In particular, it is contemplated by the inventors that the various hinge types disclosed herein can be interchanged in the various array embodiments. Also, the reflector array embodiments disclosed herein can be practiced with optical switch embodiments having one, two, three, and more reflector arrays. Also, the principles of the present invention may be practiced with reflectors having other structures and reflector geometries. Furthermore, the examples provided herein are intended to be illustrative rather than limiting. The inventions illustratively disclosed herein can be practiced without any element which is not specifically disclosed herein.

What is claimed is:

1. A method for forming an array of MEMS optical elements, the method comprising:
    providing a single crystal silicon on insulator (SOI) wafer having a layered structure comprising a silicon wafer layer having an internal oxide layer formed thereon and having a device silicon layer formed on the internal oxide layer, wherein a top surface of the device silicon layer has formed thereon a top oxide layer, and wherein the bottom surface of the silicon wafer layer has formed thereon a bottom oxide layer;
    forming a bottom photoresist layer on the bottom oxide film layer having openings defining a bottom pocket;
    forming a top photoresist layer on the top oxide film layer having openings defining a hinge region and open regions;
    removing the top oxide layer in the hinge and open regions defined by the openings in the top photoresist layer to expose the hinge region of the device silicon layer;
    forming a second photoresist layer on a top surface of the SOI wafer, the second photoresist layer patterning the hinge region of the device silicon layer so that a hinge can be formed;
    etching the patterned hinge region to remove portions of the device silicon layer forming recessed portions defining the hinge;
    removing the second photoresist layer, thereby exposing the underlying top oxide layer as a hard mask layer having openings in the hinge and open regions;
    etching the device silicon layer through the openings in the hard mask wherein the recessed portions are etched until the internal oxide layer is reached, and wherein the unetched surfaces are partially etched leaving a portion of the unetched surfaces in place to define a thickness of the hinge;
    etching the bottom surface of the SOI wafer through openings in the bottom oxide layer to remove material from the silicon wafer layer to form a pocket region defining a movable optical element supported by the hinge; and
    etching the SOI wafer to remove the internal oxide layer in the pocket region.

2. The method of claim 1, further comprising etching material from a separation line region between adjacent optical elements to enable the array to be separated into a plurality of smaller arrays.

3. The method of claim 2, wherein etching material from a separation line region comprises the operations of dry etching to remove material from the separation line region; laser cutting in the separation line region; and cleaving in the separation line region into separate arrays of desired sizes.

4. The method of claim 2, wherein etching material from a separation line region comprises the operations of laser cutting in the separation line region and cleaving in the separation line region into separate arrays of desired sizes.

5. The method of claim 4 wherein etching material from a separation line region comprises the operations of dry etching to remove material from the separation line region and cleaving in the separation line region into separate arrays of desired sizes.

6. The method of claim 4 further comprising assembling the separated arrays with another wafer having formed thereon appropriate driving elements and control circuitry, and packaging the assembled arrays.

7. The method of claim 6 wherein packaging the assembled arrays comprises hermetically packaging the assembled arrays.

8. A method for forming an array of MEMS optical elements, the method comprising:
    providing a wafer having top surface and a bottom surface, the top surface having formed thereon a top insulating layer and the bottom surface having formed thereon a bottom insulating layer;
    forming a bottom mask layer on the bottom oxide film layer having openings defining a bottom pocket;
    forming a top mask layer on the top insulating layer having openings defining hinge regions and open structures;
    first etching to remove the top insulating layer in hinge and open regions defined by the openings in the top mask layer exposing a hinge region;
    forming a second mask layer on the top surface, the second mask layer patterning the hinge region so that a hinge can be formed;
    second etching the patterned hinge region and open region to form a hinge in the wafer;
    removing the second mask layer, thereby exposing the underlying top insulating layer as a hard mask layer having openings in the hinge and open regions;
    third etching the wafer through the openings in the hard mask wherein the recessed portions are etched in a timed etch leaving a portion of the unetched surfaces in place as hinges, thereby defining hinge thickness;
    fourth etching the bottom surface of the wafer through openings in the bottom oxide layer to remove material from the silicon wafer to form a pocket region defining a movable optical element supported by hinges; and
    forming a reflective layer on at least one surface of the movable optical element.

9. The method of claim 8 further including a fifth etching to remove material from a separation line region thereby enabling the structure to be separated into arrays of a desired size.

10. The method of claim 9 wherein the operation of fifth etching comprises the operations of dry etching to remove material from the separation line region; laser cutting in the separation line region; and cleaving in the separation line region into separate arrays of desired sizes.

11. The method of claim 9 wherein the operation of fifth etching comprises the operations of laser cutting in the separation line region; and cleaving in the separation line region into separate arrays of desired sizes.

12. The method of claim 9 wherein the operation of fifth etching comprises the operations of dry etching to remove material from the separation line region; and cleaving in the separation line region into separate arrays of desired sizes.

13. The method of claim 9 further comprising assembling the separated arrays with another wafer having formed thereon appropriate driving elements and control circuitry, and packaging the assembled arrays.

* * * * *